(12) United States Patent
Lyu et al.

(10) Patent No.: US 11,747,594 B2
(45) Date of Patent: Sep. 5, 2023

(54) OPTICAL IMAGING LENS ASSEMBLY

(71) Applicant: Zhejiang Sunny Optical Co., Ltd., Ningbo (CN)

(72) Inventors: Saifeng Lyu, Ningbo (CN); Ming Li, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 497 days.

(21) Appl. No.: 16/844,736

(22) Filed: Apr. 9, 2020

(65) Prior Publication Data

US 2020/0233188 A1    Jul. 23, 2020

Related U.S. Application Data

(63) Continuation of application No. PCT/CN2018/125257, filed on Dec. 29, 2018.

(30) Foreign Application Priority Data

Jan. 5, 2018  (CN) .......................... 201810011264.5

(51) Int. Cl.
| | |
|---|---|
| *G02B 13/00* | (2006.01) |
| *G02B 9/64* | (2006.01) |
| *G02B 27/00* | (2006.01) |
| *H04N 23/55* | (2023.01) |

(52) U.S. Cl.
CPC ........... *G02B 13/0045* (2013.01); *G02B 9/64* (2013.01); *G02B 27/0025* (2013.01); *H04N 23/55* (2023.01)

(58) Field of Classification Search
CPC ... G02B 9/00; G02B 9/62; G02B 9/64; G02B 13/0045; G02B 27/0025; H04N 5/2254

USPC ................................. 359/751, 755, 682, 657
See application file for complete search history.

(56) References Cited

U.S. PATENT DOCUMENTS

| | | | | |
|---|---|---|---|---|
| 2007/0201142 A1* | 8/2007 | Narikawa | ............ | G02B 15/177 359/680 |
| 2007/0223106 A1* | 9/2007 | Kamo | ............ | G02B 15/144113 359/687 |
| 2011/0157724 A1* | 6/2011 | Baba | .................. | G02B 13/0045 359/740 |

(Continued)

FOREIGN PATENT DOCUMENTS

| | | |
|---|---|---|
| CN | 101373261 | 2/2009 |
| CN | 105116519 | 12/2015 |

(Continued)

*Primary Examiner* — Travis S Fissel
(74) *Attorney, Agent, or Firm* — Barnes & Thornburg LLP

(57) ABSTRACT

The present disclosure discloses an optical imaging lens assembly. The optical imaging lens assembly includes, sequentially from an object side to an image side along an optical axis, a first lens, a second lens, a third lens, a fourth lens, a fifth lens, a sixth lens and a seventh lens. The first lens has a positive refractive power, and an object-side surface thereof is a convex surface; the second lens has a negative refractive power, and an image-side surface thereof is a concave surface; each of the third lens, the fourth lens, the fifth lens and the sixth lens have a positive refractive power or a negative refractive power; the seventh lens has a negative refractive power, and an object-side surface thereof is a concave surface. A total effective focal length f of the optical imaging lens assembly and an effective focal length f1 of the first lens satisfy $f/f1 \geq 2.0$.

15 Claims, 15 Drawing Sheets

(56) References Cited

U.S. PATENT DOCUMENTS

| | | | | |
|---|---|---|---|---|
| 2014/0204478 A1* | 7/2014 | Asami | ............... | G02B 13/0045 |
| | | | | 359/752 |
| 2015/0009578 A1* | 1/2015 | Shinohara | ............... | G02B 9/64 |
| | | | | 359/708 |
| 2017/0123187 A1* | 5/2017 | Heu | ......................... | G02B 9/62 |
| 2017/0329108 A1* | 11/2017 | Hashimoto | ........ | G02B 13/0045 |
| 2019/0146188 A1* | 5/2019 | Lyu | .................... | G02B 13/0045 |
| | | | | 359/708 |

FOREIGN PATENT DOCUMENTS

| | | |
|---|---|---|
| CN | 105301746 | 2/2016 |
| CN | 105319680 | 2/2016 |
| CN | 105988199 | 10/2016 |
| CN | 106842512 A | 6/2017 |
| CN | 107367827 A | 11/2017 |
| CN | 107422465 A | 12/2017 |
| CN | 206710689 U | 12/2017 |
| CN | 107957619 A | 4/2018 |
| CN | 207663138 U | 7/2018 |
| JP | 2012118332 A | 6/2012 |

* cited by examiner

OPTICAL IMAGING LENS ASSEMBLY

CROSS-REFERENCE TO RELATED APPLICATIONS

The present patent application is a continuation of International Application No. PCT/CN2018/125257, filed on Dec. 29, 2018, which claims the priority from Chinese Patent Application No. 201810011264.5, filed before the China National Intellectual Property Administration (CNIPA) on Jan. 5, 2018. Both of the aforementioned patent applications are hereby incorporated by reference in their entireties.

TECHNICAL FIELD

The present disclosure relates to an optical imaging lens assembly, and more specifically to an optical imaging lens assembly including seven lenses.

BACKGROUND

As portable electronic devices, such as smart phones and the like have good portability, the applications of these portable electronic devices are becoming more and more popular. It is desirable to use the portable electronic devices to photography the distant scenery in the wild, highlighting the subject and blurring the background. Accordingly, lens assemblies of these devices are not only required to have long-focus characteristics, but also required to have miniaturization characteristics and high imaging quality. However, the existing long-focus lens assemblies usually increase the number of lenses to achieve high imaging quality, which would result in large size of the lens assemblies and thus does not meet the requirements on characteristics of long-focus, miniaturization and high imaging quality at the same time.

SUMMARY

The present disclosure provides an optical imaging lens assembly such as a long-focus lens assembly that at least or partially addresses at least one of the above disadvantages of the prior art.

According to an aspect of the present disclosure, an optical imaging lens assembly is provided. The optical imaging lens assembly may include, sequentially from an object side to an image side along an optical axis, a first lens, a second lens, a third lens, a fourth lens, a fifth lens, a sixth lens and a seventh lens. The first lens may have a positive refractive power, and an object-side surface thereof may be a convex surface; the second lens may have a negative refractive power, and an image-side surface thereof may be a concave surface; each of the third lens, the fourth lens, the fifth lens and the sixth lens has a positive refractive power or a negative refractive power; the seventh lens may have a negative refractive power, and an object-side surface thereof may be a concave surface. A total effective focal length f of the optical imaging lens assembly and an effective focal length f1 of the first lens may satisfy $f/f1 \geq 2.0$.

In one implementation, the total effective focal length f of the optical imaging lens assembly and the effective focal length f1 of the first lens may satisfy $2.0 \leq f/f1 \leq 7.0$.

In one implementation, half of a maximal field-of-view HFOV of the optical imaging lens assembly may satisfy $HFOV \leq 35°$.

In one implementation, a sum of center thicknesses $\Sigma CT$ on the optical axis of the first lens to the seventh lens and a sum of spaced distances $\Sigma AT$ on the optical axis between any two adjacent lenses of the first lens to the seventh lens may satisfy $\Sigma CT/\Sigma AT < 2.5$.

In one implementation, an effective focal length f3 of the third lens, an effective focal length f4 of the fourth lens and a distance TTL on the optical axis from a center of the object-side surface of the first lens to an imaging plane of the optical imaging lens assembly may satisfy $-5.5 < (f3+f4)/TTL < 5.0$.

In one implementation, the total effective focal length f of the optical imaging lens assembly and a radius of curvature R4 of the image-side surface of the second lens may satisfy $1.0 < f/R4 < 3.5$.

In one implementation, an effective focal length f7 of the seventh lens and an effective focal length f2 of the second lens may satisfy $0.5 < f7/f2 < 2.0$.

In one implementation, an effective focal length f3 of the third lens, an effective focal length f4 of the fourth lens and an effective focal length f5 of the fifth lens may satisfy $0 \leq f3/|f4+f5| \leq 3.0$.

In one implementation, an effective focal length f7 of the seventh lens, a radius of curvature R11 of an object-side surface of the sixth lens and a radius of curvature R12 of an image-side surface of the sixth lens may satisfy $-1.5 < f7/|R11+R12|$.

In one implementation, a radius of curvature R3 of an object-side surface of the second lens and a radius of curvature R4 of the image-side surface of the second lens may satisfy $|R3+R4|/|R3-R4| < 3.5$.

In one implementation, a radius of curvature R7 of an object-side surface of the fourth lens and a radius of curvature R12 of an image-side surface of the sixth lens may satisfy $0 < R7/R12 < 3.0$.

In one implementation, an abbe number V5 of the fifth lens, an abbe number V6 of the sixth lens and an abbe number V7 of the seventh lens may satisfy $1.0 < (V5+V6)/V7 < 7.0$.

According to another aspect of the present disclosure, an optical imaging lens assembly is provided. The optical imaging lens assembly may include sequentially from an object side to an image side along an optical axis, a first lens, a second lens, a third lens, a fourth lens, a fifth lens, a sixth lens and a seventh lens. The first lens may have a positive refractive power, and an object-side surface thereof may be a convex surface; the second lens may have a negative refractive power, and an image-side surface thereof may be a concave surface; each of the third lens, the fifth lens and the sixth lens has a positive refractive power or a negative refractive power; the fourth lens has a positive refractive power or a negative refractive power, and an object-side surface thereof may be a concave surface; the seventh lens may have a negative refractive power, and an object-side surface thereof may be a concave surface. An effective focal length f7 of the seventh lens and an effective focal length f2 of the second lens may satisfy $0.5 < f7/f2 < 2.0$.

According to still another aspect of the present disclosure, an optical imaging lens assembly is provided. The optical imaging lens assembly may include sequentially from an object side to an image side along an optical axis, a first lens, a second lens, a third lens, a fourth lens, a fifth lens, a sixth lens and a seventh lens. The first lens may have a positive refractive power, and an object-side surface thereof may be a convex surface; the second lens may have a negative refractive power, and an image-side surface thereof may be a concave surface; each of the third lens, the fourth lens, the fifth lens and the sixth lens has a positive refractive power or a negative refractive power; an object-side surface of the sixth lens may be a concave surface, and an image-side surface of the sixth lens may be a convex surface; the seventh lens may have a negative refractive power, and an object-side surface thereof may be a concave surface. Half of a maximal field-of-view HFOV of the optical imaging lens assembly may satisfy HFOV≤30°.

The present disclosure employs a plurality of lenses (e.g., seven lenses), and the optical imaging lens assembly described above has at least one advantageous effect such as miniaturization, long-focus, high imaging quality and the like by properly distributing the refractive power, the surface shape, the center thickness of each lens, and the spaced interval on the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings.

DETAILED DESCRIPTION OF EMBODIMENTS

Figure 1:
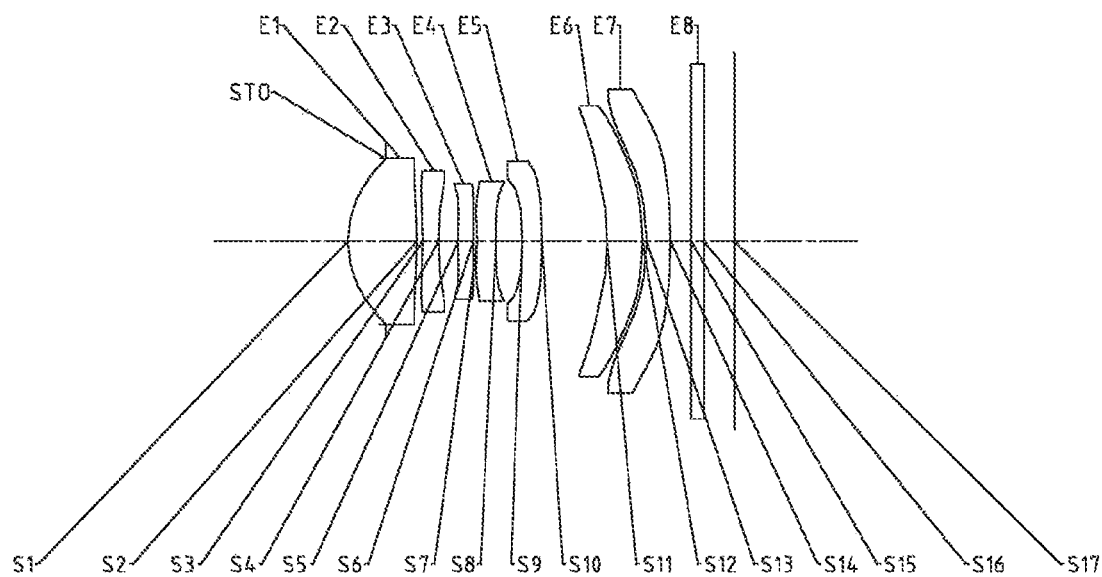
FIG. 1 is a schematic structural view of an optical imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; if a surface of a lens is a concave surface and the position of the concave is not defined, it indicates that the surface of the lens is concave at least in the paraxial region. In each lens, the surface closest to the object side is referred to as an object-side surface, and the surface closest to the image side is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical imaging lens assembly according to exemplary implementations of the present disclosure may include, for example, seven lenses having refractive powers, i.e., a first lens, a second lens, a third lens, a fourth lens, a fifth lens, sixth lens and seventh lens. These seven lenses are sequentially arranged from an object side to an image side along an optical axis.

In an exemplary implementation, the first lens may have a positive refractive power, and an object-side surface thereof may be a convex surface; the second lens may have a negative refractive power, and an image-side surface thereof may be a concave surface; the third lens has a positive refractive power or a negative refractive power; the fourth lens has a positive refractive power or a negative refractive power; the fifth lens has a positive refractive power or a negative refractive power; the sixth lens has a positive refractive power or a negative refractive power; and the seventh lens may have a negative refractive power, and an object-side surface thereof may be a concave surface.

In an exemplary implementation, the third lens may have a positive refractive power.

In an exemplary implementation, the fourth lens may have a negative refractive power, and an object-side surface thereof may be a concave surface.

In an exemplary implementation, an object-side surface of the sixth lens may be a concave surface, and an image-side surface thereof may be a convex surface.

In an exemplary implementation, the optical imaging lens assembly of the present disclosure may satisfy $HFOV \leq 35°$, where HFOV is half of a maximal field-of-view of the optical imaging lens assembly. More specifically, HFOV may further satisfy $HFOV \leq 30°$, for example, $23.5° \leq HFOV \leq 25.7°$. Properly controlling HFOV is advantageous to improve the optical performance of the lens assembly.

In an exemplary implementation, the optical imaging lens assembly of the present disclosure may satisfy $f/f1 \geq 2.0$, where f is a total effective focal length of the optical imaging lens assembly, and f1 is an effective focal length of the first lens. More specifically, f and f1 may further satisfy $2.0 \leq f/f1 \leq 7.0$, for example $2.0 \leq f/f1 \leq 3.0$, for example, $2.06 \leq f/f1 \leq 2.52$. Properly controlling the refractive power of the first lens is advantageous to reduce the sensitivity of the lens assembly and ensure the lens assembly to have a good imaging effect, and also advantageous to highlight the long-focus characteristics of the lens assembly while maintaining the miniaturization of the lens assembly.

In an exemplary implementation, the optical imaging lens assembly of the present disclosure may satisfy $-5.5<(f3+f4)/TTL<5.0$, where f3 is an effective focal length of the third lens, f4 is an effective focal length of the fourth lens, and TTL is a distance on the optical axis from a center of the object-side surface of the first lens to an imaging plane of the optical imaging lens assembly. More specifically, f3, f4 and TTL may further satisfy $-5.09 \leq (f3+f4)/TTL \leq 4.48$. Satisfying the formula $-5.5<(f3+f4)/TTL<5.0$ is beneficial to reduce light deflection, improve high-order aberrations, and ensure the miniaturization of the lens assembly.

In an exemplary implementation, the optical imaging lens assembly of the present disclosure may satisfy $1.0<f/R4<3.5$, where f is a total effective focal length of the optical imaging lens assembly, and R4 is a radius of curvature of the image-side surface of the second lens. More specifically, f and R4 may further satisfy $1.13 \leq f/R4 \leq 3.08$. By changing the radius of curvature of the image-side surface of the second lens and make the second lens to cooperate with the first lens, the purpose of compensating high-order spherical aberrations is achieved and the sensitivity of the central field-of-view is reduced simultaneously.

In an exemplary implementation, the optical imaging lens assembly of the present disclosure may satisfy $0.5<f7/f2<2.0$, where f7 is an effective focal length of the seventh lens, and f2 is an effective focal length of the second lens. More specifically, f7 and f2 may further satisfy $0.65 \leq f7/f2 \leq 1.74$. The chromatic aberration and astigmatism of the lens assembly are improved by properly assigning the effective focal lengths of the second lens and the seventh lens.

In an exemplary implementation, the optical imaging lens assembly of the present disclosure may satisfy $0<R7/R12<3.0$, where R7 is a radius of curvature of an object-side surface of the fourth lens, and R12 is a radius of curvature of an image-side surface of the sixth lens. More specifically, R7 and R12 may further satisfy $0.35 \leq R7/R12 \leq 2.62$. The coma of the off-axis field-of-view of the lens assembly is improved by the cooperation of the radii of curvature of different surfaces of the lenses.

In an exemplary implementation, the optical imaging lens assembly of the present disclosure may satisfy $-1.5<f7/|R11+R12|$, where f7 is an effective focal length of the seventh lens, R11 is a radius of curvature of an object-side surface of the sixth lens, and R12 is a radius of curvature of an image-side surface of the sixth lens. More specifically, f7, R11 and R12 may further satisfy $-1.5<f7/|R11+R12|<0$, for example $-1.25 \leq f7/|R11+R12| \leq -0.35$. Satisfying the formula $-1.5<f7/|R11+R12|$ is beneficial to improve the astigmatism of the lens assembly and reduce distortion, and also beneficial to correct the chromatic aberration of the off-axis field-of-view.

In an exemplary implementation, the optical imaging lens assembly of the present disclosure may satisfy $\Sigma CT/\Sigma AT<2.5$, where $\Sigma CT$ is a sum of center thicknesses on the optical axis of the first lens, the second lens, the third lens, the fourth lens, the fifth lens, the sixth lens and the seventh lens, and $\Sigma AT$ is a sum of spaced distances on the optical axis between any two adjacent lenses of the first lens to the seventh lens. More specifically, $\Sigma CT$ and $\Sigma AT$ may further satisfy $0.5<\Sigma CT/\Sigma AT<2.5$, for example, $0.74 \leq \Sigma CT/\Sigma AT<2.11$. By properly assigning the center thickness of each lens and the air intervals between the lenses, miniaturization and good processing characteristics of the lens assembly are advantageously ensured.

In an exemplary implementation, the optical imaging lens assembly of the present disclosure may satisfy 0≤f3/|f4+f5|≤3.0, where f3 is an effective focal length of the third lens, f4 is an effective focal length of the fourth lens, and f5 is an effective focal length of the fifth lens. More specifically, f3, f4 and f5 may further satisfy 0.00≤f3/|f4+f5|≤2.90. Satisfying the formula 0≤f3/|f4+f5|≤3.0 is beneficial to reduce the angle of deflection of light, improve high-order aberrations, and also beneficial to reduce the total length of the lens assembly and ensure miniaturization of the lens assembly.

In an exemplary implementation, the optical imaging lens assembly of the present disclosure may satisfy 1.0<(V5+V6)/V7<7.0, where V5 is an abbe number of the fifth lens, V6 is an abbe number of the sixth lens and V7 is an abbe number of the seventh lens. More specifically, V5, V6 and V7 may further satisfy 1.0<(V5+V6)/V7<2.0, for example (V5+V6)/V7=1.43. Reasonable selection of lenses made of different materials is helpful for correcting chromatic aberrations of off-axis field-of-view.

In an exemplary implementation, the optical imaging lens assembly of the present disclosure may satisfy |R3+R4|/|R3−R4|<3.5, where R3 is a radius of curvature of an object-side surface of the second lens, and R4 is a radius of curvature of the image-side surface of the second lens. More specifically, R3 and R4 may further satisfy 0.19≤|R3+R4|/|R3−R4|≤3.16. Properly distributing the radii of curvature of the object-side surface and the image-side surface of the second lens is beneficial to compensate high-order spherical aberration and reduce the sensitivity of the lens assembly.

In an exemplary implementation, the optical imaging lens assembly may further include at least one stop to improve the imaging quality thereof. For example, the stop may be disposed between the object side and the first lens.

Alternatively, the optical imaging lens assembly described above may further include an optical filter for correcting chromatic aberration and/or a protective glass for protecting a photosensitive element on the imaging plane.

The optical imaging lens assembly according to the above implementations of the present disclosure may employ a plurality of lenses, such as seven lenses as described above. By properly disposing the refractive power, the surface shape, the center thickness of each lens, and spaced distances on the optical axis between the lenses, the size and the sensitivity of the optical imaging lens assembly can be effectively reduced, and the processability of the optical imaging lens assembly can be improved, such that the optical imaging lens assembly is more conducive to production and processing and can be applied to portable electronic products.

The optical imaging lens assembly configured as above also has a small depth of field and a large zoom ratio, and thus can capture a larger image at a given distance and therefore is suitable for capturing a distant object. In addition, if the optical imaging lens assembly configure as above is used with a wide-angle lens assembly, an imaging effect with good amplification factor and imaging quality can be obtained under the condition of auto-focus.

In the implementations of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. With an aspheric lens, the aberrations that occur during imaging can be eliminated as much as possible, and thus improving imaging quality.

However, it will be understood by those skilled in the art that the number of lenses constituting the optical imaging lens assembly can be varied to achieve the various results and advantages described in this specification without departing from the technical solution claimed by the present disclosure. For example, although the implementation are described by taking seven lenses as an example, the optical imaging lens assembly is not limited to including seven lenses. The optical imaging lens assembly can also include other numbers of lenses if desired.

Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of an optical imaging lens assembly according to embodiment 1 of the present disclosure.

As shown in FIG. 1, the optical imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a convex surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a convex surface. The sixth lens E6 has a positive refractive power, and an object-side surface S11 thereof is a concave surface, and an image-side surface S12 thereof is a convex surface. The seventh lens E7 has a negative refractive power, and an object-side surface S13 thereof is a concave surface, and an image-side surface S14 thereof is a convex surface. The optical filter E8 has an object-side surface S15 and an image-side surface S16. Light from the object sequentially passes through the respective surfaces S1 to S16 and is finally imaged on the imaging plane S17.

Table 1 shows the surface type, radius of curvature, thickness, material and conic coefficient of each lens of the optical imaging lens assembly in embodiment 1, wherein the units for the radius of curvature and the thickness are millimeter (mm).

TABLE 1

| Surface number | Surface Type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.6224 | | | |
| S1 | aspheric | 1.7003 | 1.1350 | 1.55 | 56.1 | −0.4688 |
| S2 | aspheric | −14.8737 | 0.0901 | | | −30.0000 |
| S3 | aspheric | −9.4367 | 0.2600 | 1.67 | 20.4 | 16.7337 |
| S4 | aspheric | 6.3590 | 0.3231 | | | −1.9547 |
| S5 | aspheric | 14.9761 | 0.2461 | 1.64 | 23.8 | 25.0000 |
| S6 | aspheric | −39.1618 | 0.0651 | | | 25.0000 |
| S7 | aspheric | −5.3654 | 0.3037 | 1.55 | 56.1 | 19.7923 |
| S8 | aspheric | 13.9488 | 0.4326 | | | 25.0000 |
| S9 | aspheric | −6.7999 | 0.3200 | 1.55 | 56.1 | 24.9993 |
| S10 | aspheric | −12.2705 | 1.0688 | | | −3.5435 |
| S11 | aspheric | −4.4687 | 0.5800 | 1.64 | 23.8 | 2.8539 |
| S12 | aspheric | −3.7088 | 0.0664 | | | 1.3840 |
| S13 | aspheric | −3.0865 | 0.3890 | 1.54 | 55.7 | −11.9843 |
| S14 | aspheric | −22.0882 | 0.3400 | | | 0.9992 |
| S15 | spherical | infinite | 0.2100 | 1.52 | 64.2 | |
| S16 | spherical | infinite | 0.5000 | | | |
| S17 | spherical | infinite | | | | |

As can be seen from Table 1, the object-side surface and the image-side surface of any one of the first lens E1 to the seventh lens E7 are aspheric. In this embodiment, the surface shape x of each aspheric lens can be defined by using, but not limited to, the following aspheric formula:

$$x = \frac{ch^2}{1+\sqrt{1-(k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1|/R (that is, the paraxial curvature c is reciprocal of the radius of curvature in the above Table 1); k is the conic coefficient (given in Table 1); Ai is a correction coefficient for the i-th order of the aspheric surface. Table 2 below shows high-order coefficients A4, A6, A8, A10, A12, A14, A16, A18 and A20 applicable to each aspheric surface S1-S14 in embodiment 1.

TABLE 2

| Surface number | A4 | A6 | A8 | A10 | A12 | A14 | A16 | A18 |
|---|---|---|---|---|---|---|---|---|
| S1 | 9.6370E−03 | −2.1900E−03 | 5.2540E−03 | −2.3952E−03 | 0.0000E+00 | 0.0000E+00 | 0.0000E+00 | 0.0000E+00 |
| S2 | −1.2500E−02 | 1.9682E−02 | −1.6310E−02 | 5.9373E−03 | 0.0000E+00 | 0.0000E+00 | 0.0000E+00 | 0.0000E+00 |
| S3 | 1.9108E−02 | 6.8320E−03 | 1.3534E−02 | −6.7484E−02 | 1.3910E−01 | −1.3265E−01 | 6.2855E−02 | −1.1681E−02 |
| S4 | 3.5701E−02 | −2.4300E−02 | 3.1741E−02 | −1.9076E−01 | 5.1607E−01 | −6.5821E−01 | 4.0993E−01 | −1.0298E−01 |
| S5 | −4.8590E−02 | 9.5652E−02 | −5.4152E−01 | 6.3611E−01 | −3.3743E−01 | 6.5424E−02 | 0.0000E+00 | 0.0000E+00 |
| S6 | −8.5410E−02 | 5.6207E−01 | −6.4177E−01 | −3.9893E−01 | 9.2531E−01 | −3.9151E−01 | 0.0000E+00 | 0.0000E+00 |
| S7 | −1.0720E−02 | 7.2777E−01 | −5.9408E−01 | −5.8071E−01 | 1.0834E+00 | −4.6878E−01 | 0.0000E+00 | 0.0000E+00 |
| S8 | 2.8329E−02 | 2.1236E−01 | −4.7080E−01 | 6.5482E−01 | −3.8546E−01 | 6.4582E−02 | 0.0000E+00 | 0.0000E+00 |
| S9 | −6.1000E−02 | −1.2370E−02 | −5.0390E−02 | −5.0609E−02 | 6.0990E−02 | −1.1700E−02 | 0.0000E+00 | 0.0000E+00 |
| S10 | −1.3470E−02 | −6.9200E−03 | 2.2769E−02 | −1.2962E−01 | 1.7755E−01 | −1.1798E−01 | 4.0754E−02 | −6.0466E−03 |
| S11 | 2.1400E−05 | −2.9990E−02 | 5.1822E−02 | −3.1066E−02 | 9.8170E−03 | −1.7900E−03 | 1.7877E−04 | −7.5087E−06 |
| S12 | 9.7633E−02 | −1.7641E−01 | 1.2849E−01 | −4.8242E−02 | 1.0252E−02 | −1.2200E−03 | 7.1922E−05 | −1.3128E−06 |
| S13 | 5.0985E−02 | −1.2040E−01 | 9.0341E−02 | −3.7257E−02 | 9.2130E−03 | −1.3500E−03 | 1.0702E−04 | −3.5644E−06 |
| S14 | −7.1080E−02 | 6.8259E−02 | −4.0280E−02 | 1.3878E−02 | −2.9600E−03 | 3.8800E−04 | −2.8532E−05 | 8.9474E−07 |

Table 3 shows effective focal lengths f1 to f7 of respective lens, a total effective focal length f of the optical imaging lens assembly, a total track length TTL (i.e., a distance on the optical axis from a center of the object-side surface S1 of the first lens E1 to the imaging plane S17), and half of a maximal field-of-view HFOV in embodiment 1.

TABLE 3

| f1 (mm) | 2.86 | f6 (mm) | 26.31 |
|---|---|---|---|
| f2 (mm) | −5.67 | f7 (mm) | −6.73 |
| f3 (mm) | 16.99 | f (mm) | 7.19 |
| f4 (mm) | −7.06 | TTL (mm) | 6.33 |
| f5 (mm) | −28.53 | HFOV (°) | 23.5 |

The optical imaging lens assembly in embodiment 1 satisfies:

f/f1=2.51, where f is the total effective focal length of the optical imaging lens assembly, and f1 is an effective focal length of the first lens E1;

(f3+f4)/TTL=1.57, where f3 is an effective focal length of the third lens E3, f4 is an effective focal length of the fourth lens E4, and TTL is the distance on the optical axis from the center of the object-side surface S1 of the first lens E1 to the imaging plane S17;

f/R4=1.13, where f is the total effective focal length of the optical imaging lens assembly, and R4 is a radius of curvature of the image-side surface S4 of the second lens E2;

f7/f2=1.19, where f7 is an effective focal length of the seventh lens E7, and f2 is an effective focal length of the second lens E2;

R7/R12=1.45, where R7 is a radius of curvature of the object-side surface S7 of the fourth lens E4, and R12 is a radius of curvature of the image-side surface S12 of the sixth lens E6;

f7/|R11+R12|=−0.82, where f7 is an effective focal length of the seventh lens E7, R11 is a radius of curvature of the object-side surface S11 of the sixth lens E6, and R12 is a radius of curvature of the image-side surface S12 of the sixth lens E6;

ΣCT/ΣAT=1.58, where ΣCT is a sum of center thicknesses on the optical axis of the first lens E1 to the seventh lens E7, and ΣAT is a sum of spaced distances on the optical axis between any two adjacent lenses of the first lens to the seventh lens;

f3/|f4+f5|=0.48, where f3 is an effective focal length of the third lens E3, f4 is an effective focal length of the fourth lens E4, and f5 is an effective focal length of the fifth lens E5;

(V5+V6)/V7=1.43, where V5 is the abbe number of the fifth lens E5, V6 is the abbe number of the sixth lens E6, and V7 is the abbe number of the seventh lens E7; and

|R3+R4|/|R3−R4|=0.19, where R3 is a radius of curvature of the object-side surface S3 of the second lens E2, and R4 is a radius of curvature of the image-side surface S4 of the second lens E2.

Figures 2A, 2B:
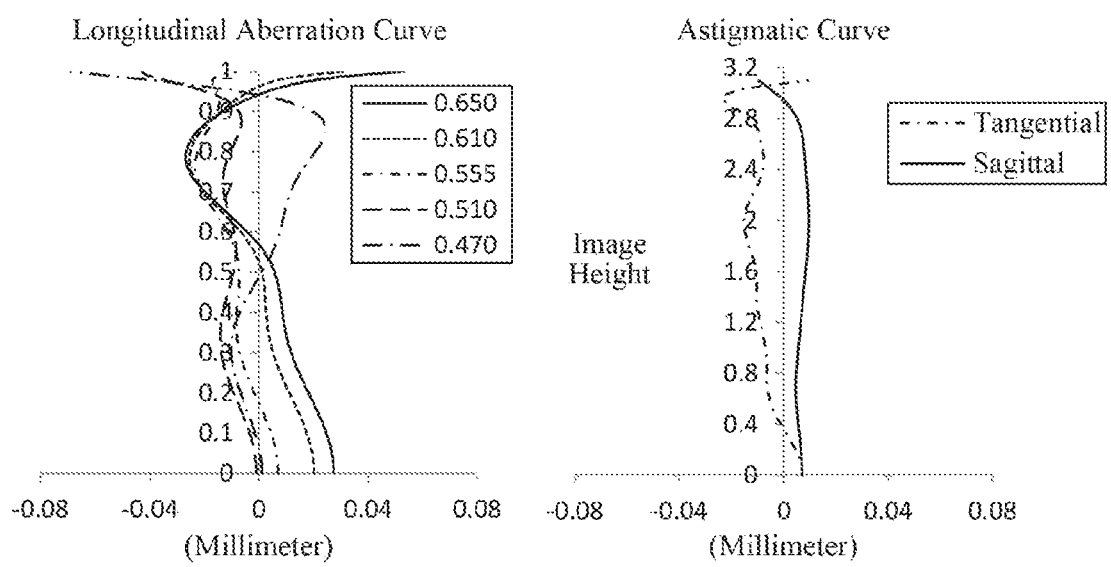
FIGS. 2A to 2D illustrate a longitudinal aberration curve, an astigmatism curve, a distortion curve and a lateral color curve of the optical imaging lens assembly according to embodiment 1, respectively.
Figure 2C:
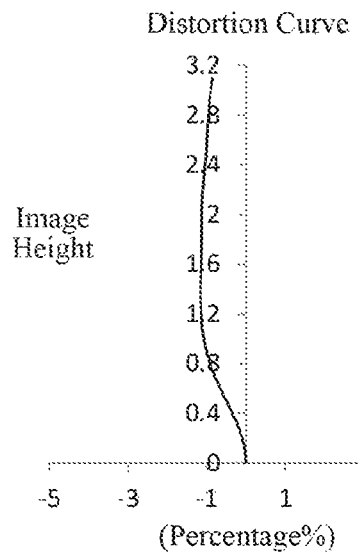
Figure 2D:
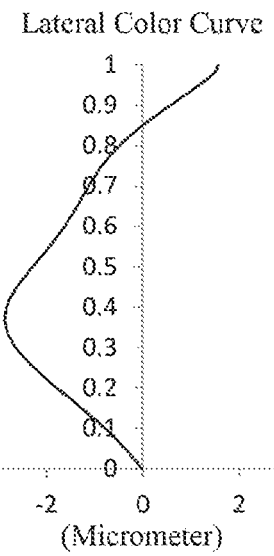

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatism curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion corresponding to different FOVs. FIG. 2D illustrates a lateral color curve of the optical imaging lens assembly according to embodiment 1, representing deviations of different image heights on an imaging plane after light passes through the optical imaging lens assembly. It can be seen from FIG. 2A to FIG. 2D that the optical imaging lens assembly provided in embodiment 1 can achieve a good imaging quality.

Embodiment 2

Figure 3:
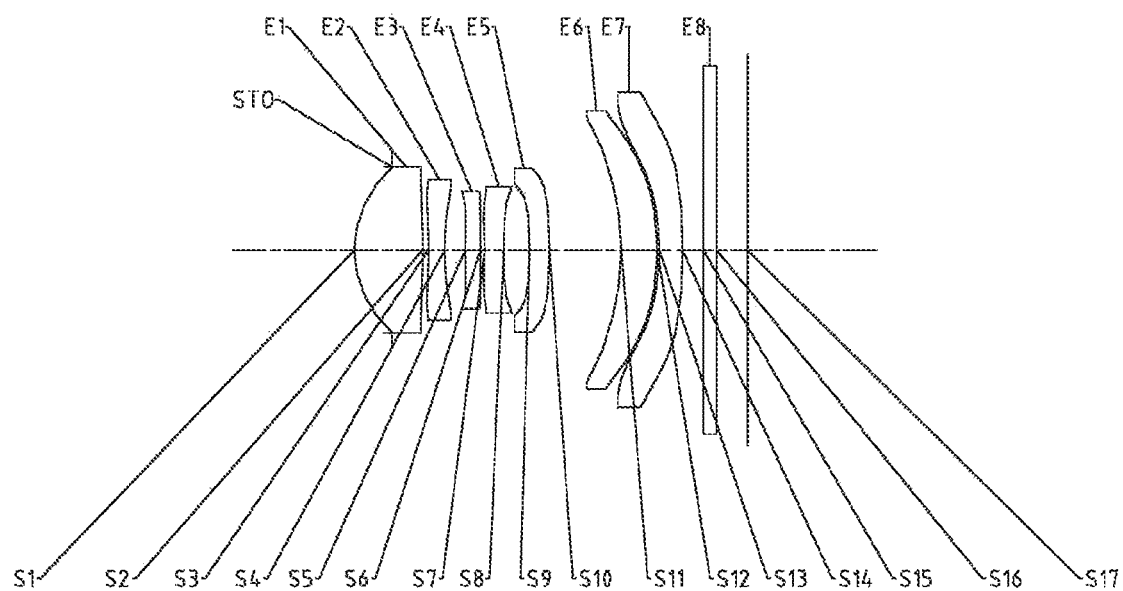
FIG. 3 is a schematic structural view of an optical imaging lens assembly according to embodiment 2 of the present disclosure.

An optical imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging lens assembly according to embodiment 2 of the present disclosure.

As shown in FIG. 3, the optical imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a convex surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a convex surface. The sixth lens E6 has a positive refractive power, and an object-side surface S11 thereof is a concave surface, and an image-side surface S12 thereof is a convex surface. The seventh lens E7 has a negative refractive power, and an object-side surface S13 thereof is a concave surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

Table 4 shows the surface type, radius of curvature, thickness, material and conic coefficient of each lens of the optical imaging lens assembly in embodiment 2, wherein the units for the radius of curvature and the thickness are millimeter (mm).

TABLE 4

| Surface number | Surface Type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.6005 | | | |
| S1 | aspheric | 1.7031 | 1.1040 | 1.55 | 56.1 | −0.4675 |
| S2 | aspheric | −15.3943 | 0.0908 | | | −30.0000 |
| S3 | aspheric | −10.5425 | 0.2600 | 1.67 | 20.4 | 16.7337 |
| S4 | aspheric | 5.5504 | 0.3319 | | | −6.7424 |
| S5 | aspheric | 12.6516 | 0.2444 | 1.64 | 23.8 | 25.0000 |
| S6 | aspheric | −28.5027 | 0.0696 | | | 25.0000 |
| S7 | aspheric | −4.8902 | 0.3037 | 1.55 | 56.1 | 18.4867 |
| S8 | aspheric | 10.1436 | 0.4163 | | | 25.0000 |
| S9 | aspheric | −15.4545 | 0.3200 | 1.55 | 56.1 | 24.9993 |
| S10 | aspheric | −17.5028 | 1.1561 | | | −3.5435 |
| S11 | aspheric | −4.4560 | 0.5789 | 1.64 | 23.8 | 2.8682 |
| S12 | aspheric | −3.6956 | 0.0344 | | | 1.3871 |
| S13 | aspheric | −3.8246 | 0.3698 | 1.54 | 55.7 | −12.4239 |
| S14 | aspheric | 76.1286 | 0.3401 | | | 0.9992 |
| S15 | spherical | infinite | 0.2100 | 1.52 | 64.2 | |
| S16 | spherical | infinite | 0.5000 | | | |
| S17 | spherical | infinite | | | | |

As can be seen from Table 4, in embodiment 2, the object-side surface and the image-side surface of any one of the first lens E1 to the seventh lens E7 are aspheric. Table 5 shows high-order coefficients applicable to each aspheric surface in embodiment 2, wherein the surface shape of each aspheric surface can be defined by the formula (1) given in the above embodiment 1.

TABLE 5

| Surface number | A4 | A6 | A8 | A10 | A12 | A14 | A16 | A18 |
|---|---|---|---|---|---|---|---|---|
| S1 | 9.5804E−03 | −1.2400E−03 | 4.3520E−03 | −2.0690E−03 | 0.0000E+00 | 0.0000E+00 | 0.0000E+00 | 0.0000E+00 |
| S2 | −1.0667E−02 | 2.0717E−02 | −1.5850E−02 | 5.6846E−03 | 0.0000E+00 | 0.0000E+00 | 0.0000E+00 | 0.0000E+00 |
| S3 | 1.4534E−02 | 2.9120E−03 | 2.7912E−02 | −6.3056E−02 | 9.9329E−02 | −8.4870E−02 | 3.8243E−02 | −6.9732E−03 |
| S4 | 3.2392E−02 | −4.8180E−02 | 6.8480E−02 | −1.4304E−01 | 2.9405E−01 | −3.3977E−01 | 2.0053E−01 | −5.1252E−02 |
| S5 | −2.8295E−02 | −1.3320E−02 | −3.7919E−01 | 5.2497E−01 | −2.4360E−01 | 1.2963E−02 | 0.0000E+00 | 0.0000E+00 |
| S6 | −3.0525E−02 | 2.9405E−01 | −3.2412E−01 | 4.6221E−01 | −2.0615E−01 | −2.0114E−01 | 0.0000E+00 | 0.0000E+00 |
| S7 | −1.0087E−03 | 5.3479E−01 | −2.5740E−01 | −6.2778E−01 | 8.4189E−01 | −3.2251E−01 | 0.0000E+00 | 0.0000E+00 |
| S8 | −1.8317E−02 | 2.3391E−01 | −3.6553E−01 | 3.7071E−01 | −1.6756E−01 | 1.6818E−02 | 0.0000E+00 | 0.0000E+00 |
| S9 | −1.0107E−01 | −3.5340E−02 | 9.8746E−02 | −2.7198E−01 | 2.4337E−01 | −8.4240E−02 | 0.0000E+00 | 0.0000E+00 |
| S10 | −4.2050E−02 | −1.7410E−02 | 5.4168E−02 | −1.2926E−01 | 1.3561E−01 | −7.6940E−02 | 2.3790E−02 | −3.3859E−03 |
| S11 | 9.0010E−03 | −4.6530E−02 | 6.0757E−02 | −3.5350E−02 | 1.1726E−02 | −2.3600E−03 | 2.7030E−04 | −1.3308E−05 |
| S12 | 7.1223E−02 | −1.1574E−01 | 7.8927E−02 | −2.9367E−02 | 6.5370E−03 | −8.7000E−04 | 6.3847E−05 | −1.8680E−06 |
| S13 | −3.5990E−02 | 2.2675E−02 | −1.7970E−02 | 6.6637E−03 | −1.0600E−03 | 5.0300E−05 | 3.7781E−06 | −3.5044E−07 |
| S14 | −1.2728E−01 | 1.2182E−01 | −7.0510E−02 | 2.4047E−02 | −5.0300E−03 | 6.4100E−04 | −4.5565E−05 | 1.3826E−06 |

Table 6 shows effective focal lengths f1 to f7 of respective lens, a total effective focal length f of the optical imaging lens assembly, a total optical length TTL, and half of a maximal field-of-view HFOV in embodiment 2.

TABLE 6

| f1 (mm) | 2.87 | f6 (mm) | 26.14 |
|---|---|---|---|
| f2 (mm) | −5.43 | f7 (mm) | −6.77 |
| f3 (mm) | 13.75 | f (mm) | 7.07 |
| f4 (mm) | −6.00 | TTL (mm) | 6.33 |
| f5 (mm) | −256.03 | HFOV (°) | 24.2 |

Figure 4A:
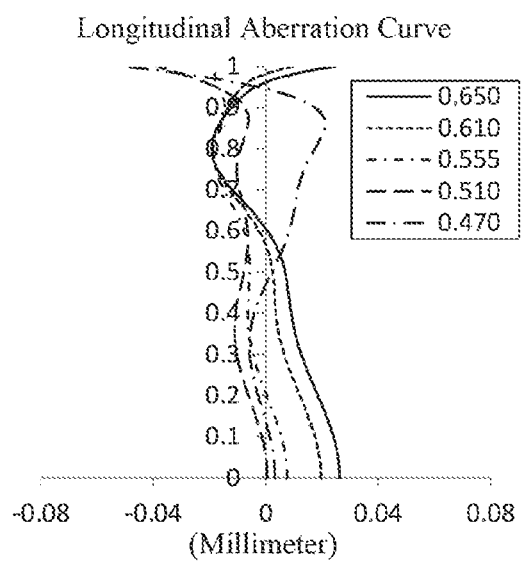
FIGS. 4A to 4D illustrate a longitudinal aberration curve, an astigmatism curve, a distortion curve and a lateral color curve of the optical imaging lens assembly according to embodiment 2, respectively.
Figure 4B:
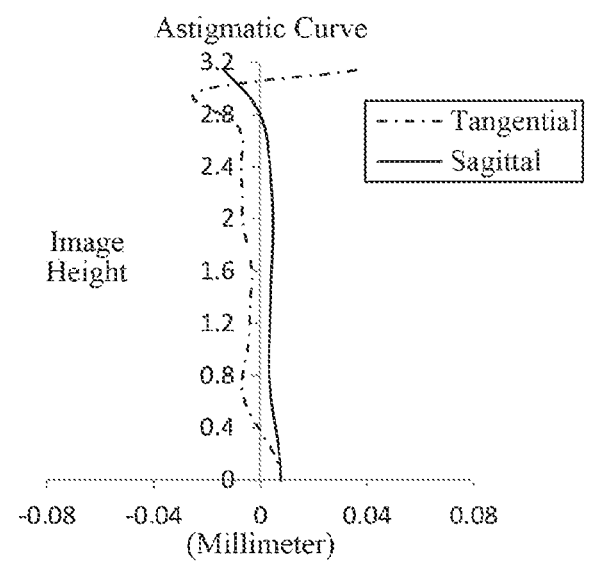
Figure 4C:
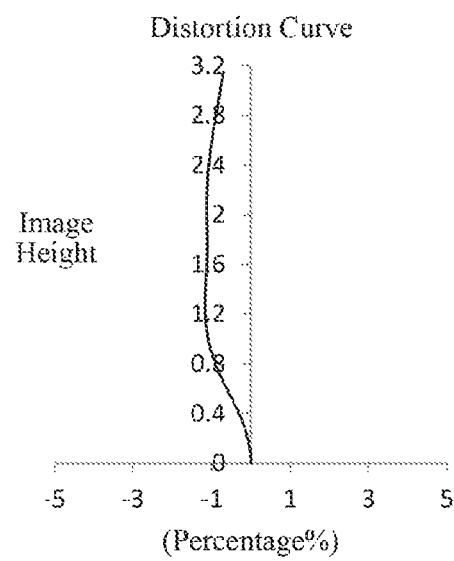
Figure 4D:
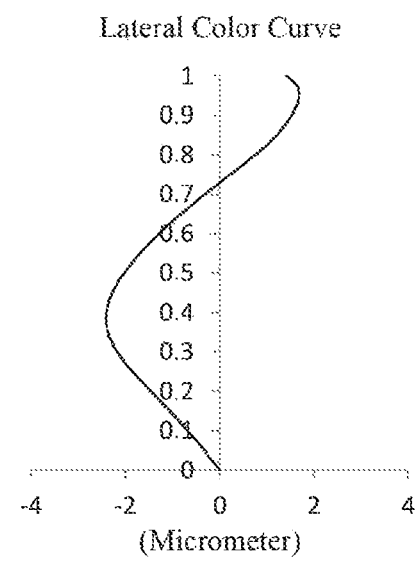

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatism curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion corresponding to different FOVs. FIG. 4D illustrates a lateral color curve of the optical imaging lens assembly according to embodiment 2, representing deviations of different image heights on an imaging plane after light passes through the optical imaging lens assembly. It can be seen from FIG. 4A to FIG. 4D that the optical imaging lens assembly provided in embodiment 2 can achieve a good imaging quality.

Embodiment 3

Figure 5:
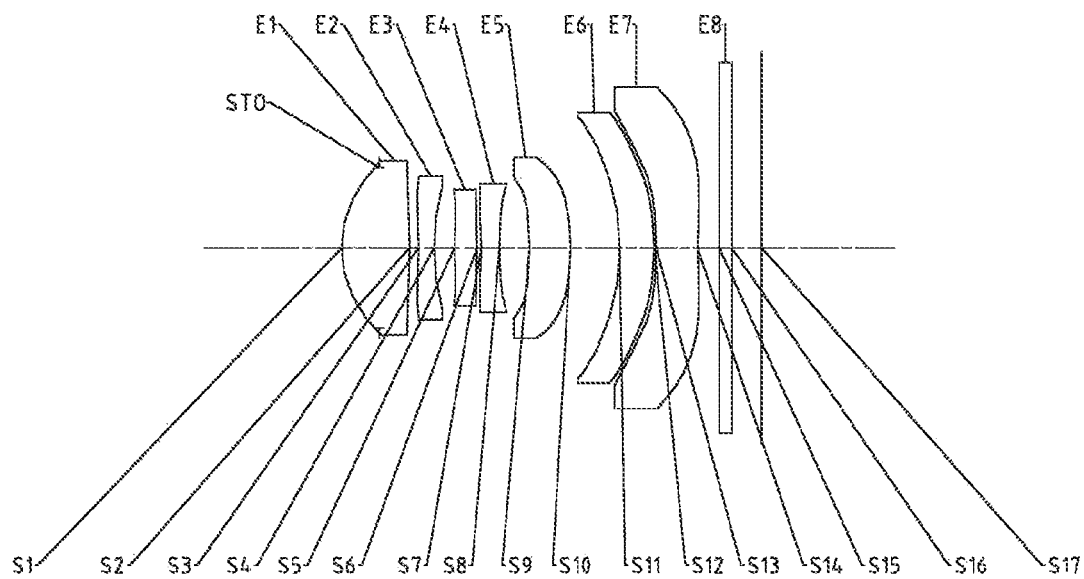
FIG. 5 is a schematic structural view of an optical imaging lens assembly according to embodiment 3 of the present disclosure.

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a convex surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a positive refractive power, and an object-side surface S9 thereof is a concave surface, and an image-side surface S10 thereof is a convex surface. The sixth lens E6 has a positive refractive power, and an object-side surface S11 thereof is a concave surface, and an image-side surface S12 thereof is a convex surface. The seventh lens E7 has a negative refractive power, and an object-side surface S13 thereof is a concave surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

Table 7 shows the surface type, radius of curvature, thickness, material and conic coefficient of each lens of the optical imaging lens assembly in embodiment 3, wherein the units for the radius of curvature and the thickness are millimeter (mm).

TABLE 7

| Surface number | Surface Type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.6296 | | | |
| S1 | aspheric | 1.8602 | 1.1311 | 1.55 | 56.1 | −0.4720 |
| S2 | aspheric | −17.3456 | 0.1499 | | | −30.0000 |
| S3 | aspheric | −12.1474 | 0.2625 | 1.67 | 20.4 | 16.7337 |
| S4 | aspheric | 4.5215 | 0.3382 | | | −3.3960 |
| S5 | aspheric | 7.3979 | 0.3736 | 1.64 | 23.8 | 25.0000 |
| S6 | aspheric | −23.0569 | 0.0708 | | | 25.0000 |
| S7 | aspheric | −4.7707 | 0.3037 | 1.55 | 56.1 | 15.1889 |
| S8 | aspheric | 9.2239 | 0.4998 | | | 25.0000 |
| S9 | aspheric | −9.6215 | 0.6829 | 1.55 | 56.1 | 24.9993 |
| S10 | aspheric | −4.9680 | 0.8180 | | | −3.5435 |
| S11 | aspheric | −4.4124 | 0.5800 | 1.64 | 23.8 | 3.1017 |
| S12 | aspheric | −3.6808 | 0.0300 | | | 1.3252 |
| S13 | aspheric | −6.5766 | 0.6878 | 1.54 | 55.7 | −12.4239 |
| S14 | aspheric | 7.4280 | 0.3617 | | | 0.9992 |
| S15 | spherical | infinite | 0.2100 | 1.52 | 64.2 | |
| S16 | spherical | infinite | 0.5000 | | | |
| S17 | spherical | infinite | | | | |

As can be seen from Table 7, in embodiment 3, the object-side surface and the image-side surface of any one of the first lens E1 to the seventh lens E7 are aspheric. Table 8 shows high-order coefficients applicable to each aspheric surface in embodiment 3, wherein the surface shape of each aspheric surface can be defined by the formula (1) given in the above embodiment 1.

TABLE 8

| Surface number | A4 | A6 | A8 | A10 | A12 | A14 | A16 | A18 |
|---|---|---|---|---|---|---|---|---|
| S1 | 7.8387E−03 | 1.8000E−05 | 1.5590E−03 | −6.7928E−04 | 0.0000E+00 | 0.0000E+00 | 0.0000E+00 | 0.0000E+00 |
| S2 | −4.0811E−03 | 1.1059E−02 | −6.4800E−03 | 1.5759E−03 | 0.0000E+00 | 0.0000E+00 | 0.0000E+00 | 0.0000E+00 |
| S3 | 1.1437E−02 | 9.3780E−03 | 2.0972E−02 | −3.6140E−02 | 3.3791E−02 | −1.8470E−02 | 5.8522E−03 | −8.4916E−04 |
| S4 | 1.7980E−02 | −3.3690E−02 | 9.8389E−02 | −1.6644E−01 | 2.2589E−01 | −2.0683E−01 | 1.1172E−01 | −2.8524E−02 |
| S5 | −4.1215E−02 | −9.8470E−02 | 1.8359E−02 | 4.0431E−02 | 1.5432E−02 | −2.0640E−02 | 0.0000E+00 | 0.0000E+00 |
| S6 | 1.9334E−02 | −3.0440E−02 | −9.5470E−02 | 2.6392E−01 | −2.1764E−01 | 6.0721E−02 | 0.0000E+00 | 0.0000E+00 |
| S7 | 8.0431E−02 | 1.2442E−01 | −1.9993E−01 | 2.4188E−01 | −1.7822E−01 | 5.3680E−02 | 0.0000E+00 | 0.0000E+00 |
| S8 | 2.0722E−03 | 1.0026E−01 | −1.0388E−01 | 4.4957E−02 | −5.9288E−03 | −9.9000E−04 | 0.0000E+00 | 0.0000E+00 |
| S9 | −8.5519E−02 | 4.0970E−03 | 1.7155E−02 | −3.7234E−02 | 2.1683E−02 | −6.7300E−03 | 0.0000E+00 | 0.0000E+00 |
| S10 | −5.6728E−02 | −1.0510E−02 | 3.7433E−02 | −4.5681E−02 | 3.0255E−02 | −1.2650E−02 | 3.0275E−03 | −3.2514E−04 |
| S11 | 4.5113E−03 | −4.3400E−02 | 5.4813E−02 | −3.0900E−02 | 9.9570E−03 | −1.9400E−03 | 2.1629E−04 | −1.0321E−05 |

TABLE 8-continued

| Surface number | A4 | A6 | A8 | A10 | A12 | A14 | A16 | A18 |
|---|---|---|---|---|---|---|---|---|
| S12 | 7.0776E−02 | −1.0659E−01 | 7.1134E−02 | −2.5688E−02 | 5.5490E−03 | −7.2000E−04 | 5.1041E−05 | −1.4539E−06 |
| S13 | 1.1531E−02 | −5.6090E−02 | 3.3293E−02 | −1.0755E−02 | 2.3300E−03 | −3.4000E−04 | 3.0721E−05 | −1.2230E−06 |
| S14 | −7.1563E−02 | 3.6363E−02 | −1.6650E−02 | 4.9130E−03 | −9.1000E−04 | 1.0200E−04 | −6.3665E−06 | 1.6979E−07 |

Table 9 shows effective focal lengths f1 to f7 of respective lens, a total effective focal length f of the optical imaging lens assembly, a total optical length TTL, and half of a maximal field-of-view HFOV in embodiment 3.

TABLE 9

| f1 (mm) | 3.14 | f6 (mm) | 26.55 |
|---|---|---|---|
| f2 (mm) | −4.92 | f7 (mm) | −6.39 |
| f3 (mm) | 8.81 | f (mm) | 7.10 |
| f4 (mm) | −5.72 | TTL (mm) | 7.00 |
| f5 (mm) | 17.89 | HFOV (°) | 25.0 |

Figures 6A, 6B:
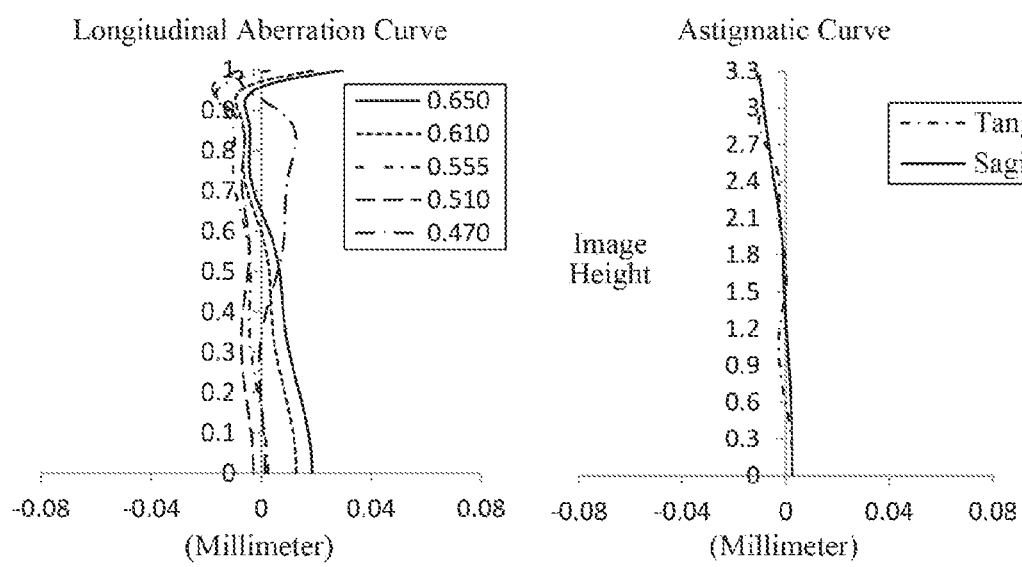
FIGS. 6A to 6D illustrate a longitudinal aberration curve, an astigmatism curve, a distortion curve and a lateral color curve of the optical imaging lens assembly according to embodiment 3, respectively.
Figure 6C:
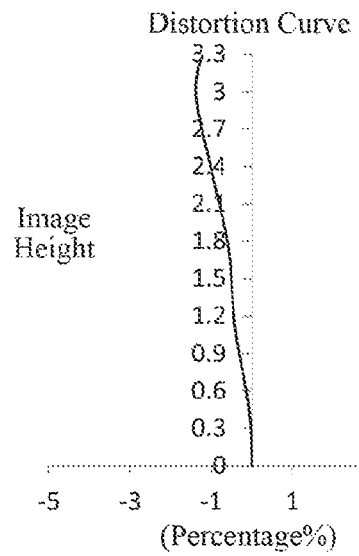
Figure 6D:
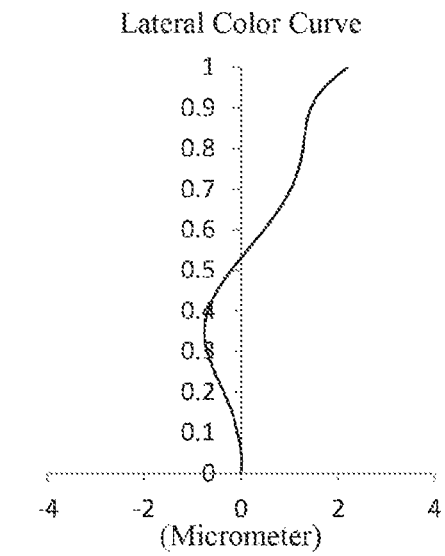

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatism curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion corresponding to different FOVs. FIG. 6D illustrates a lateral color curve of the optical imaging lens assembly according to embodiment 3, representing deviations of different image heights on an imaging plane after light passes through the optical imaging lens assembly. It can be seen from FIG. 6A to FIG. 6D that the optical imaging lens assembly provided in embodiment 3 can achieve a good imaging quality.

Embodiment 4

Figure 7:
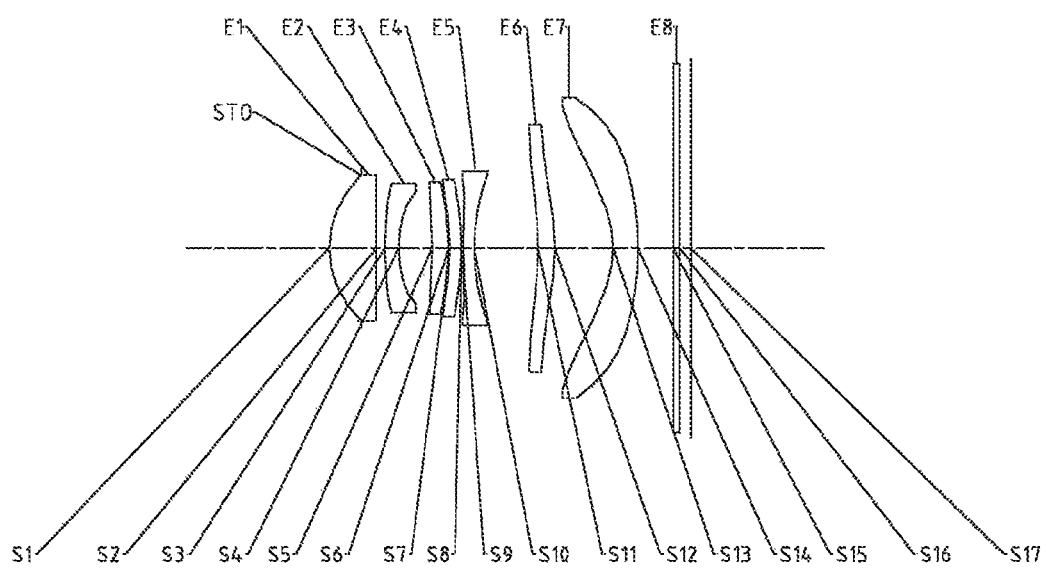
FIG. 7 is a schematic structural view of an optical imaging lens assembly according to embodiment 4 of the present disclosure.

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a convex surface. The fifth lens E5 has a negative refractive power, and an object-side surface S9 thereof is a convex surface, and an image-side surface S10 thereof is a concave surface. The sixth lens E6 has a positive refractive power, and an object-side surface S11 thereof is a concave surface, and an image-side surface S12 thereof is a convex surface. The seventh lens E7 has a negative refractive power, and an object-side surface S13 thereof is a concave surface, and an image-side surface S14 thereof is a convex surface. The optical filter E8 has an object-side surface S15 and an image-side surface S16. Light from the object sequentially passes through the respective surfaces S1 to S16 and is finally imaged on the imaging plane S17.

Table 10 shows the surface type, radius of curvature, thickness, material and conic coefficient of each lens of the optical imaging lens assembly in embodiment 4, wherein the units for the radius of curvature and the thickness are millimeter (mm).

TABLE 10

| Surface number | Surface Type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5492 | | | |
| S1 | aspheric | 1.6792 | 0.8137 | 1.55 | 56.1 | −0.0667 |
| S2 | aspheric | 100.4915 | 0.1504 | | | −30.0000 |
| S3 | aspheric | 6.7106 | 0.2383 | 1.67 | 20.4 | −0.2849 |
| S4 | aspheric | 2.3386 | 0.5764 | | | 2.9840 |
| S5 | aspheric | −5.5770 | 0.2897 | 1.64 | 23.8 | 3.6514 |
| S6 | aspheric | −3.9071 | 0.0200 | | | −2.2682 |
| S7 | aspheric | −4.3075 | 0.2000 | 1.55 | 56.1 | 2.0257 |
| S8 | aspheric | −5.1792 | 0.0200 | | | −0.1944 |
| S9 | aspheric | 9.0717 | 0.2000 | 1.55 | 56.1 | −30.0000 |
| S10 | aspheric | 3.7125 | 1.1023 | | | 0.7608 |
| S11 | aspheric | −6.2283 | 0.2916 | 1.64 | 23.8 | −23.4222 |
| S12 | aspheric | −4.0600 | 1.0092 | | | 1.3454 |
| S13 | aspheric | −1.6859 | 0.4290 | 1.54 | 55.7 | −4.8717 |
| S14 | aspheric | −4.8186 | 0.6095 | | | −29.9881 |
| S15 | spherical | infinite | 0.1100 | 1.52 | 64.2 | |
| S16 | spherical | infinite | 0.2000 | | | |
| S17 | spherical | infinite | | | | |

As can be seen from Table 10, in embodiment 4, the object-side surface and the image-side surface of any one of the first lens E1 to the seventh lens E7 are aspheric. Table 11 shows high-order coefficients applicable to each aspheric surface in embodiment 4, wherein the surface shape of each aspheric surface can be defined by the formula (1) given in the above embodiment 1.

TABLE 11

| Surface number | A4 | A6 | A8 | A10 | A12 | A14 |
|---|---|---|---|---|---|---|
| S1 | 1.4277E−03 | −2.8000E−04 | −2.5000E−04 | 1.1612E−04 | −7.3217E−05 | −3.0000E−04 |
| S2 | −1.6669E−03 | −3.3000E−04 | −9.3000E−05 | −3.6174E−05 | −3.6800E−05 | −5.4000E−05 |
| S3 | −1.5874E−04 | 1.5860E−03 | 2.8110E−03 | 2.9427E−03 | 1.3642E−03 | −1.1500E−03 |
| S4 | 1.1742E−02 | 6.2680E−03 | 7.1230E−03 | 8.3191E−03 | 4.7823E−03 | 4.9620E−03 |
| S5 | 3.8656E−02 | −4.1000E−03 | 1.7890E−03 | 6.5749E−04 | 1.0313E−03 | 3.2220E−03 |
| S6 | 3.7601E−03 | 1.8460E−03 | 1.4690E−03 | 1.2978E−03 | 6.4312E−04 | −2.2000E−04 |
| S7 | −1.9202E−02 | 2.1832E−02 | 3.4850E−03 | 1.6864E−03 | 3.9375E−04 | −2.8000E−04 |
| S8 | 1.3275E−04 | 1.9880E−03 | 7.7200E−04 | 5.5041E−05 | −1.5111E−06 | 4.2100E−04 |
| S9 | −1.2454E−02 | −1.4270E−02 | −1.5000E−03 | 6.1890E−06 | −6.5446E−05 | −2.9000E−04 |
| S10 | −6.4962E−04 | 2.3700E−05 | −1.7000E−04 | −2.0167E−04 | −3.0273E−05 | 7.9200E−06 |
| S11 | −1.2886E−03 | 2.1250E−03 | 1.6800E−04 | 1.9049E−05 | −1.5616E−05 | −1.9000E−06 |
| S12 | 2.3036E−02 | −7.1000E−04 | 7.9000E−04 | −1.2166E−04 | −4.3878E−06 | −6.2000E−08 |
| S13 | −1.2350E−02 | 2.2320E−03 | 1.7000E−04 | −3.5536E−05 | 3.9347E−07 | 1.7500E−08 |
| S14 | −1.3219E−02 | 6.0300E−04 | −2.6000E−04 | 9.7890E−06 | 6.0415E−07 | 4.2700E−08 |

Table 12 shows effective focal lengths f1 to f7 of respective lens, a total effective focal length f of the optical imaging lens assembly, a total optical length TTL, and half of a maximal field-of-view HFOV in embodiment 4.

TABLE 12

| f1 (mm) | 3.12 | f6 (mm) | 17.35 |
|---|---|---|---|
| f2 (mm) | −5.51 | f7 (mm) | −5.07 |
| f3 (mm) | 19.13 | f (mm) | 7.19 |
| f4 (mm) | −51.01 | TTL (mm) | 6.26 |
| f5 (mm) | −11.66 | HFOV (°) | 24.7 |

Figure 8A:
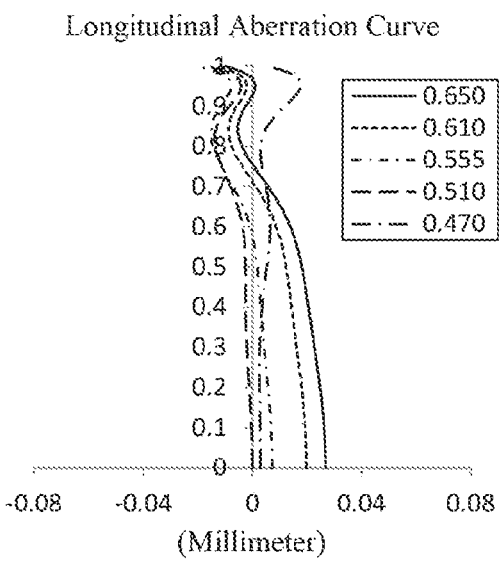
FIGS. 8A to 8D illustrate a longitudinal aberration curve, an astigmatism curve, a distortion curve and a lateral color curve of the optical imaging lens assembly according to embodiment 4, respectively.
Figure 8B:
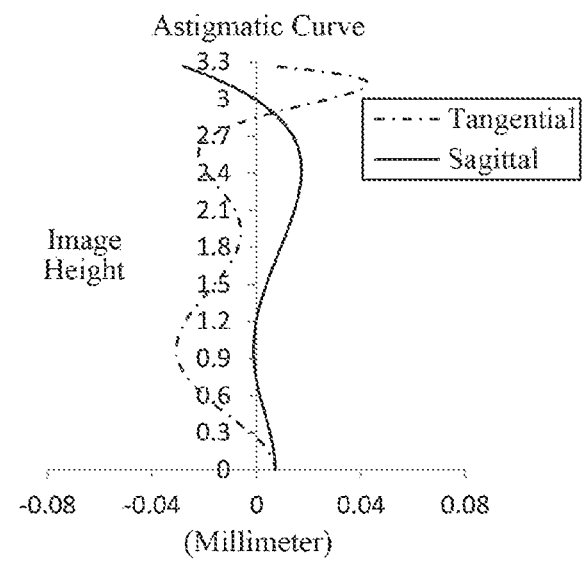
Figure 8C:
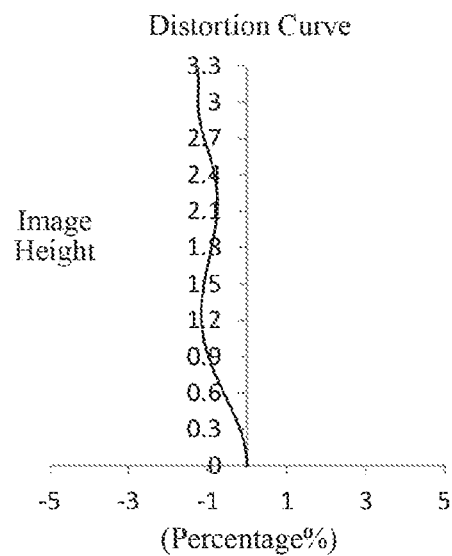
Figure 8D:
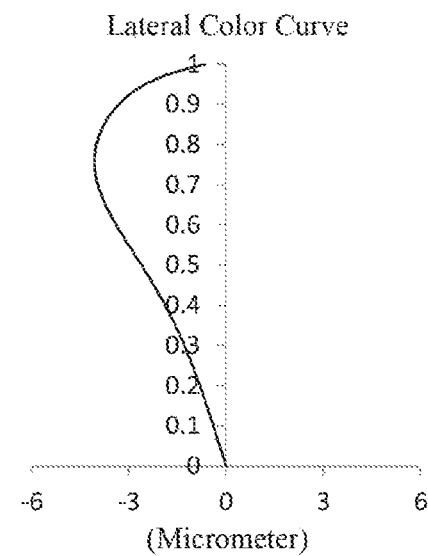

FIG. 8A illustrates a longitudinal aberration curve of the optical imaging lens assembly according to embodiment 4, representing deviations of focal points converged by light of different wavelengths after passing through the optical imaging lens assembly. FIG. 8B illustrates an astigmatism curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion corresponding to different FOVs. FIG. 8D illustrates a lateral color curve of the optical imaging lens assembly according to embodiment 4, representing deviations of different image heights on an imaging plane after light passes through the optical imaging lens assembly. It can be seen from FIG. 8A to FIG. 8D that the optical imaging lens assembly provided in embodiment 4 can achieve a good imaging quality.

Embodiment 5

Figure 9:
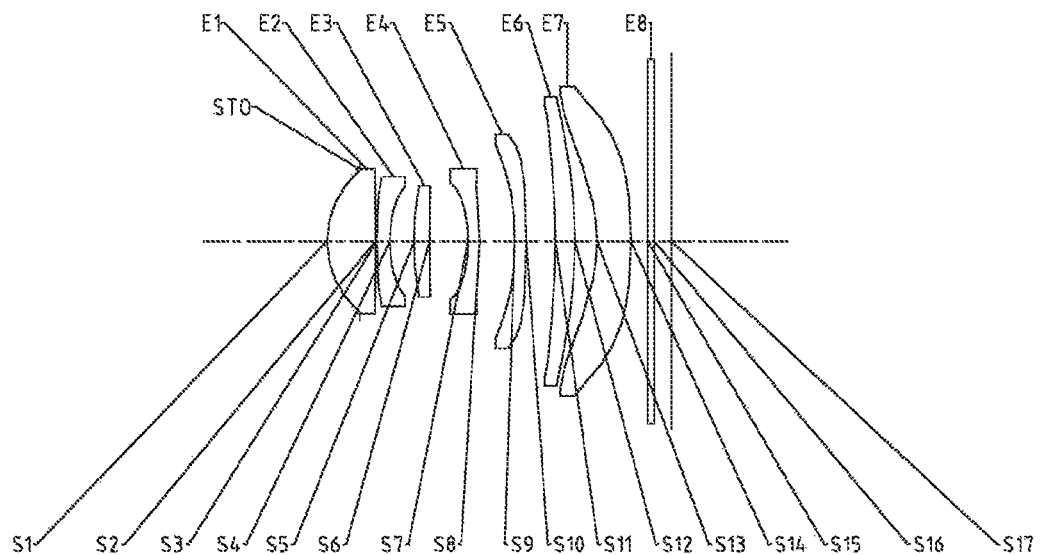
FIG. 9 is a schematic structural view of an optical imaging lens assembly according to embodiment 5 of the present disclosure.

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, and an object-side surface S1 thereof is a convex surface, and an image-side surface S2 thereof is a convex surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a concave surface. The fourth lens E4 has a negative refractive power, and an object-side surface S7 thereof is a concave surface, and an image-side surface S8 thereof is a convex surface. The fifth lens E5 has a negative refractive power, and an object-side surface S9 thereof is a concave surface, and an image-side surface S10 thereof is a convex surface. The sixth lens E6 has a positive refractive power, and an object-side surface S11 thereof is a concave surface, and an image-side surface S12 thereof is a convex surface. The seventh lens E7 has a negative refractive power, and an object-side surface S13 thereof is a concave surface, and an image-side surface S14 thereof is a convex surface. The optical filter E8 has an object-side surface S15 and an image-side surface S16. Light from the object sequentially passes through the respective surfaces S1 to S16 and is finally imaged on the imaging plane S17.

Table 13 shows the surface type, radius of curvature, thickness, material and conic coefficient of each lens of the optical imaging lens assembly in embodiment 5, wherein the units for the radius of curvature and the thickness are millimeter (mm).

TABLE 13

| Surface number | Surface Type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5704 | | | |
| S1 | aspheric | 1.6066 | 0.8471 | 1.55 | 56.1 | −0.0513 |
| S2 | aspheric | −40.9322 | 0.0200 | | | −30.0000 |
| S3 | aspheric | 11.2325 | 0.2300 | 1.67 | 20.4 | 25.0000 |
| S4 | aspheric | 2.5840 | 0.4226 | | | 4.0428 |
| S5 | aspheric | 7.5940 | 0.2654 | 1.64 | 23.8 | 24.1223 |
| S6 | aspheric | 10.5782 | 0.6728 | | | −30.0000 |
| S7 | aspheric | −2.8334 | 0.2000 | 1.55 | 56.1 | 6.1382 |
| S8 | aspheric | −4.6414 | 0.6132 | | | −22.4062 |
| S9 | aspheric | −6.3444 | 0.2000 | 1.55 | 56.1 | −16.0341 |
| S10 | aspheric | −31.5755 | 0.5106 | | | 25.0000 |
| S11 | aspheric | −10.9916 | 0.3387 | 1.64 | 23.8 | −9.1254 |
| S12 | aspheric | −8.0990 | 0.3875 | | | 6.6903 |
| S13 | aspheric | −2.5762 | 0.5871 | 1.54 | 55.7 | −10.2895 |
| S14 | aspheric | −10.1669 | 0.2950 | | | 11.0285 |
| S15 | spherical | infinite | 0.1100 | 1.52 | 64.2 | |
| S16 | spherical | infinite | 0.3000 | | | |
| S17 | spherical | infinite | | | | |

As can be seen from Table 13, in embodiment 5, the object-side surface and the image-side surface of any one of the first lens E1 to the seventh lens E7 are aspheric. Table 14 shows high-order coefficients applicable to each aspheric surface in embodiment 5, wherein the surface shape of each aspheric surface can be defined by the formula (1) given in the above embodiment 1.

TABLE 14

| Surface number | A4 | A6 | A8 | A10 | A12 | A14 |
|---|---|---|---|---|---|---|
| S1 | −5.4174E−05 | −2.0590E−03 | 7.4980E−04 | 6.5877E−05 | −1.3847E−03 | 0.0000E+00 |
| S2 | 3.4421E−03 | −6.7600E−04 | −5.0000E−04 | 2.5007E−04 | 3.0584E−04 | −9.3768E−05 |
| S3 | 1.6940E−03 | 4.9319E−03 | 4.1844E−03 | 1.7673E−03 | 4.0174E−05 | 0.0000E+00 |
| S4 | 5.3185E−03 | 1.0915E−02 | 6.5794E−03 | 6.1565E−03 | 6.2311E−03 | 0.0000E+00 |
| S5 | −2.7401E−03 | 5.4339E−03 | 3.4509E−03 | 4.7565E−03 | 7.3063E−03 | 0.0000E+00 |
| S6 | −2.3215E−02 | −1.2576E−02 | −2.2420E−03 | 5.6881E−04 | 1.7216E−03 | 0.0000E+00 |
| S7 | 1.7642E−02 | −3.8522E−02 | 6.1014E−03 | 9.4772E−03 | −1.9214E−02 | 0.0000E+00 |
| S8 | 2.4104E−02 | 7.5953E−03 | 1.6126E−03 | −1.5292E−04 | −8.4603E−04 | 0.0000E+00 |
| S9 | −2.9735E−02 | 2.3258E−03 | 5.1710E−04 | 5.4632E−05 | −8.9734E−06 | 0.0000E+00 |
| S10 | −1.0265E−02 | −2.7580E−03 | 2.9820E−04 | 8.9328E−06 | −3.5188E−05 | 0.0000E+00 |
| S11 | 3.7115E−03 | −1.2500E−04 | −9.9900E−05 | 4.5423E−05 | −6.2004E−06 | 0.0000E+00 |
| S12 | 1.1612E−02 | −5.5370E−03 | 1.4058E−03 | −1.2717E−04 | 2.6762E−06 | 0.0000E+00 |
| S13 | −9.6305E−03 | 4.4240E−04 | 3.5370E−04 | −3.5823E−05 | 4.3486E−07 | 0.0000E+00 |
| S14 | −1.4433E−02 | 4.1430E−04 | 4.3530E−05 | −9.4622E−06 | 1.3843E−06 | 0.0000E+00 |

Table 15 shows effective focal lengths f1 to f7 of respective lens, a total effective focal length f of the optical imaging lens assembly, a total optical length TTL, and half of a maximal field-of-view HFOV in embodiment 5.

TABLE 15

| f1 (mm) | 2.85 | f6 (mm) | 46.07 |
|---|---|---|---|
| f2 (mm) | −5.10 | f7 (mm) | −6.61 |
| f3 (mm) | 40.73 | f (mm) | 7.19 |
| f4 (mm) | −13.87 | TTL (mm) | 6.00 |
| f5 (mm) | −14.58 | HFOV (°) | 24.6 |

Figure 10A:
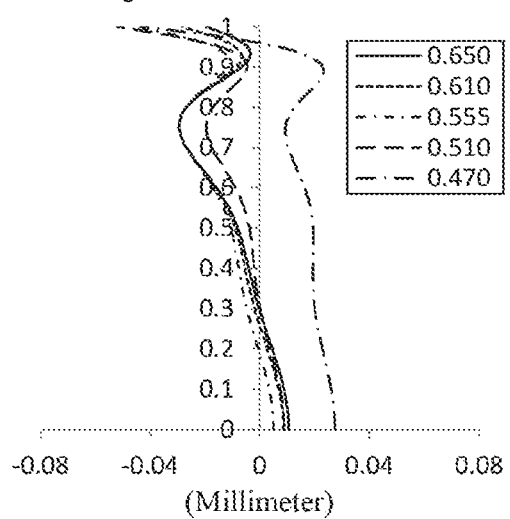
FIGS. 10A to 10D illustrate a longitudinal aberration curve, an astigmatism curve, a distortion curve and a lateral color curve of the optical imaging lens assembly according to embodiment 5, respectively.
Figure 10B:
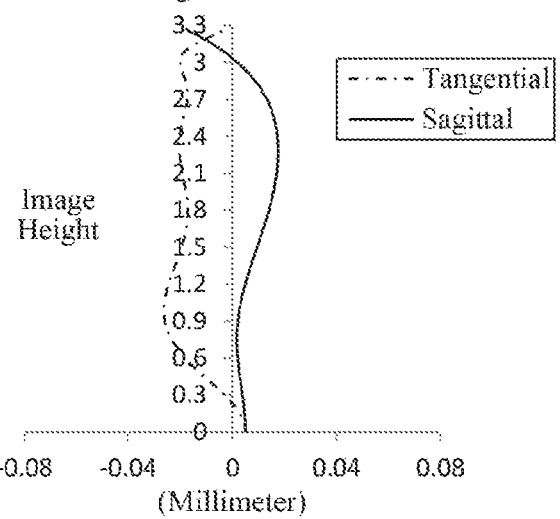
Figure 10C:
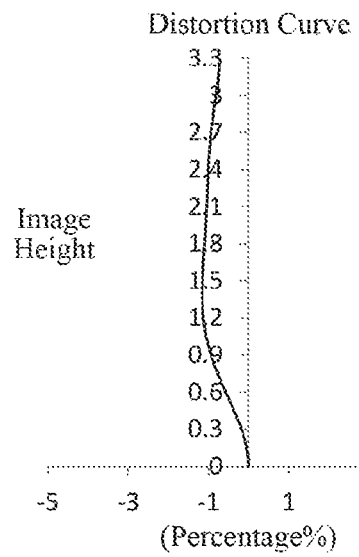
Figure 10D:
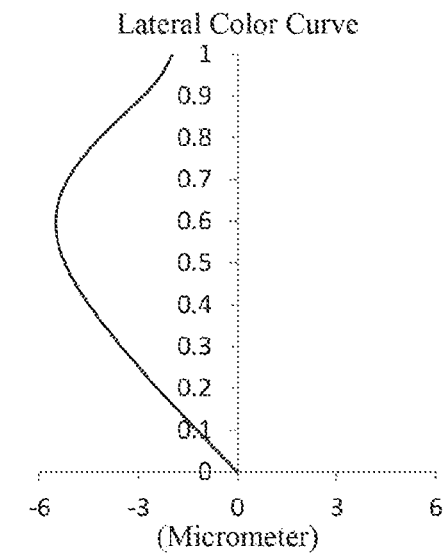

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatism curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion corresponding to different FOVs. FIG. 10D illustrates a lateral color curve of the optical imaging lens assembly according to embodiment 5, representing deviations of different image heights on an imaging plane after light passes through the optical imaging lens assembly. It can be seen from FIG. 10A to FIG. 10D that the optical imaging lens assembly provided in embodiment 5 can achieve a good imaging quality.

Embodiment 6

Figure 11:
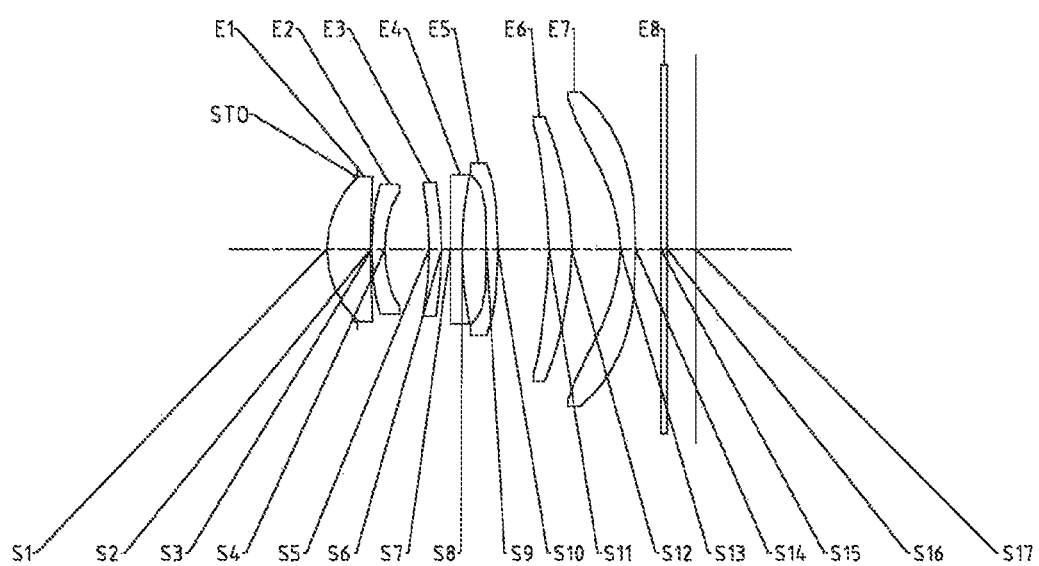
FIG. 11 is a schematic structural view of an optical imaging lens assembly according to embodiment 6 of the present disclosure.

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a positive refractive power, and an object-side surface S9 thereof is a convex surface, and an image-side surface S10 thereof is a convex surface. The sixth lens E6 has a positive refractive power, and an object-side surface S11 thereof is a concave surface, and an image-side surface S12 thereof is a convex surface. The seventh lens E7 has a negative refractive power, and an object-side surface S13 thereof is a concave surface, and an image-side surface S14 thereof is a convex surface. The optical filter E8 has an object-side surface S15 and an image-side surface S16. Light from the object sequentially passes through the respective surfaces S1 to S16 and is finally imaged on the imaging plane S17.

Table 16 shows the surface type, radius of curvature, thickness, material and conic coefficient of each lens of the optical imaging lens assembly in embodiment 6, wherein the units for the radius of curvature and the thickness are millimeter (mm).

TABLE 16

| Surface number | Surface Type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5302 | | | |
| S1 | aspheric | 1.7433 | 0.7627 | 1.55 | 56.1 | 0.0486 |
| S2 | aspheric | 17.2831 | 0.0200 | | | −30.0000 |
| S3 | aspheric | 4.9423 | 0.2300 | 1.67 | 20.4 | 0.6472 |
| S4 | aspheric | 2.5691 | 0.7686 | | | 2.7719 |
| S5 | aspheric | −7.0622 | 0.2200 | 1.64 | 23.8 | 25.0000 |
| S6 | aspheric | −5.2647 | 0.1533 | | | −7.1463 |
| S7 | aspheric | −11.3641 | 0.2037 | 1.55 | 56.1 | −27.1159 |
| S8 | aspheric | 5.9727 | 0.4230 | | | −26.1594 |
| S9 | aspheric | 103.5561 | 0.2200 | 1.55 | 56.1 | −30.0000 |
| S10 | aspheric | −10.7152 | 0.8867 | | | 25.0000 |
| S11 | aspheric | −5.9163 | 0.4013 | 1.64 | 23.8 | −19.1404 |
| S12 | aspheric | −4.3367 | 0.8453 | | | −7.9956 |

TABLE 16-continued

| Surface number | Surface Type | Radius of curvature | Thickness | Material Refractive index | Abbe number | Conic coefficient |
|---|---|---|---|---|---|---|
| S13 | aspheric | −2.3631 | 0.2654 | 1.54 | 55.7 | −6.2194 |
| S14 | aspheric | −13.3184 | 0.4400 | | | 20.7840 |
| S15 | spherical | infinite | 0.1100 | 1.52 | 64.2 | |
| S16 | spherical | infinite | 0.5000 | | | |
| S17 | spherical | infinite | | | | |

As can be seen from Table 16, in embodiment 6, the object-side surface and the image-side surface of any one of the first lens E1 to the seventh lens E7 are aspheric. Table 17 shows high-order coefficients applicable to each aspheric surface in embodiment 6, wherein the surface shape of each aspheric surface can be defined by the formula (1) given in the above embodiment 1.

TABLE 17

| Surface number | A4 | A6 | A8 | A10 | A12 |
|---|---|---|---|---|---|
| S1 | −4.5323E−04 | −2.7000E−04 | 1.8430E−04 | −4.4108E−05 | −4.5353E−04 |
| S2 | −3.3914E−03 | −1.7100E−04 | 4.5730E−05 | 1.0275E−04 | 1.6256E−04 |
| S3 | 6.4604E−04 | 9.9600E−04 | 2.1374E−03 | 1.6951E−03 | 3.0695E−04 |
| S4 | 2.9648E−03 | 6.0077E−03 | 2.5747E−03 | 2.0294E−03 | 4.5689E−03 |
| S5 | −2.4016E−02 | 1.9100E−02 | 3.4976E−03 | 1.8173E−03 | 1.8014E−05 |
| S6 | 6.3044E−03 | 1.8941E−03 | −6.0000E−04 | 8.1452E−05 | 1.1599E−03 |
| S7 | 5.4439E−02 | −2.1962E−02 | 2.3662E−03 | 1.0891E−03 | −3.5463E−04 |
| S8 | −3.9991E−03 | 1.1343E−03 | 4.7290E−04 | 3.0047E−04 | 4.5980E−04 |
| S9 | −6.0632E−02 | −1.0060E−02 | −2.2820E−03 | −1.0476E−03 | −7.6776E−04 |
| S10 | −7.6647E−03 | −1.7300E−03 | −4.8900E−04 | −8.1507E−05 | 1.2968E−06 |
| S11 | 4.5008E−03 | −9.6600E−05 | −4.8000E−05 | −1.1152E−05 | −2.5418E−06 |
| S12 | 1.2603E−02 | −7.0490E−03 | 1.4325E−03 | −1.0586E−04 | −5.7539E−07 |
| S13 | −1.3941E−02 | 4.9130E−04 | 4.1670E−04 | −3.5161E−05 | −2.3548E−07 |
| S14 | −1.7316E−02 | 1.7296E−03 | −1.3500E−04 | 1.0863E−05 | −6.5496E−07 |

Table 18 shows effective focal lengths f1 to f7 of respective lens, a total effective focal length f of the optical imaging lens assembly, a total optical length TTL, and half of a maximal field-of-view HFOV in embodiment 6.

TABLE 18

| f1 (mm) | 3.49 | f6 (mm) | 23.14 |
|---|---|---|---|
| f2 (mm) | −8.36 | f7 (mm) | −5.40 |
| f3 (mm) | 30.91 | f (mm) | 7.20 |
| f4 (mm) | −7.14 | TTL (mm) | 6.43 |
| f5 (mm) | 17.80 | HFOV (°) | 25.3 |

Figure 12A:
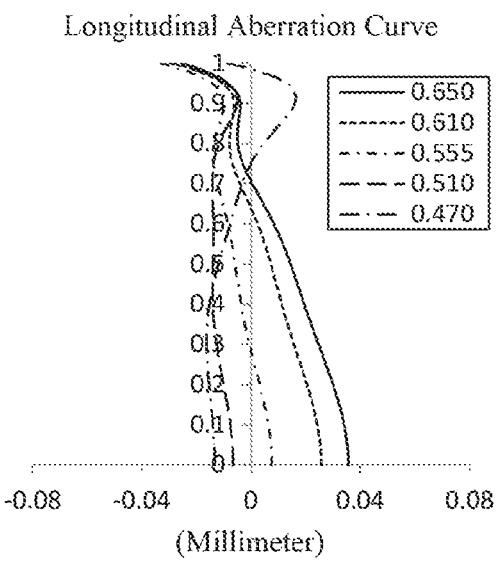
FIGS. 12A to 12D illustrate a longitudinal aberration curve, an astigmatism curve, a distortion curve and a lateral color curve of the optical imaging lens assembly according to embodiment 6, respectively.
Figure 12B:
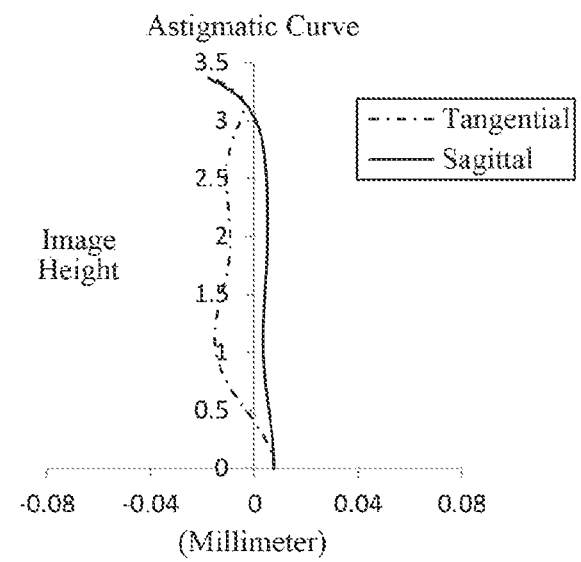
Figure 12C:
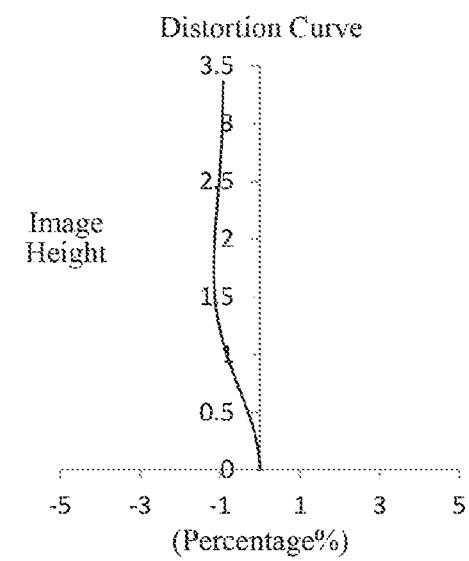
Figure 12D:
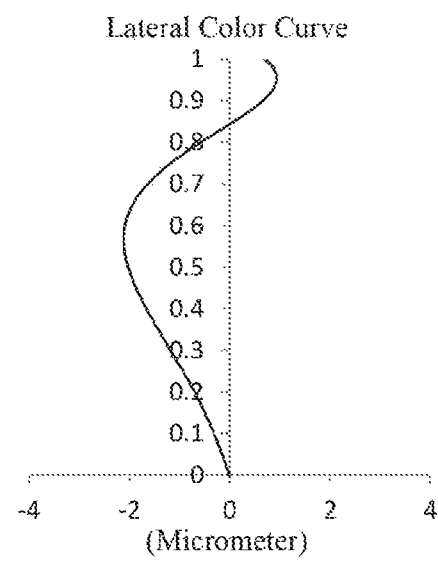

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatism curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion corresponding to different FOVs. FIG. 12D illustrates a lateral color curve of the optical imaging lens assembly according to embodiment 6, representing deviations of different image heights on an imaging plane after light passes through the optical imaging lens assembly. It can be seen from FIG. 12A to FIG. 12D that the optical imaging lens assembly provided in embodiment 6 can achieve a good imaging quality.

Embodiment 7

Figure 13:
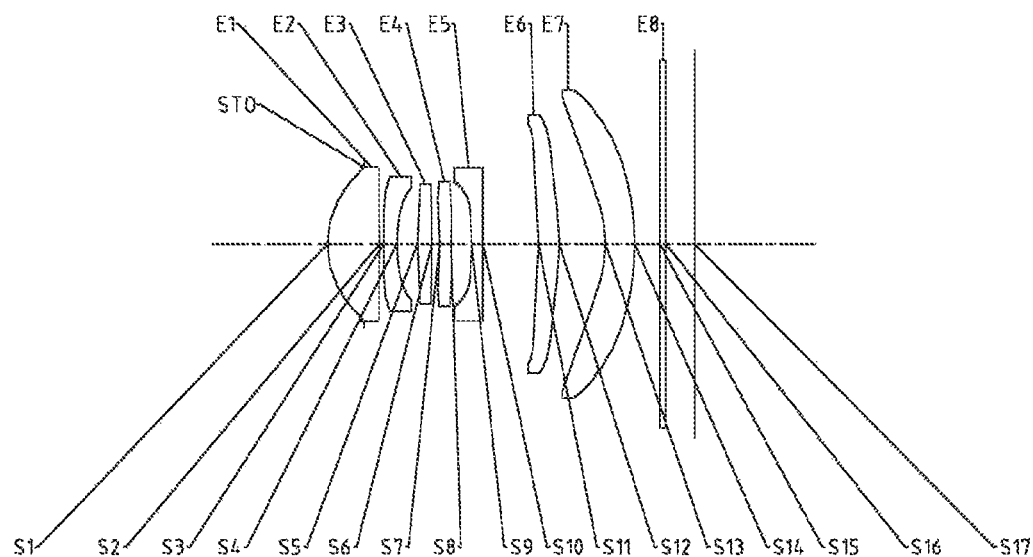
FIG. 13 is a schematic structural view of an optical imaging lens assembly according to embodiment 7 of the present disclosure.

An optical imaging lens assembly according to embodiment 7 of the present disclosure is described below with reference to FIG. 13 to FIG. 14D. FIG. 13 is a schematic structural view of the optical imaging lens assembly according to embodiment 7 of the present disclosure.

As shown in FIG. 13, the optical imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a concave surface. The sixth lens E6 has a positive refractive power, and an object-side surface S11 thereof is a concave surface, and an image-side surface S12 thereof is a convex surface. The seventh lens E7 has a negative refractive power, and an object-side surface S13 thereof is a concave surface, and an image-side surface S14 thereof is a convex surface. The optical filter E8 has an object-side surface S15 and an image-side surface S16. Light from the object sequentially passes through the respective surfaces S1 to S16 and is finally imaged on the imaging plane S17.

Table 19 shows the surface type, radius of curvature, thickness, material and conic coefficient of each lens of the optical imaging lens assembly in embodiment 7, wherein the units for the radius of curvature and the thickness are millimeter (mm).

TABLE 19

| Surface number | Surface Type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.6392 | | | |
| S1 | aspheric | 1.6461 | 0.9121 | 1.55 | 56.1 | −0.0404 |
| S2 | aspheric | 919.8064 | 0.0735 | | | −30.0000 |
| S3 | aspheric | 36.4582 | 0.2300 | 1.67 | 20.4 | 25.0000 |
| S4 | aspheric | 2.9484 | 0.3588 | | | 6.1167 |
| S5 | aspheric | 5.8982 | 0.2545 | 1.64 | 23.8 | −21.4892 |
| S6 | aspheric | −24.5543 | 0.1372 | | | −30.0000 |
| S7 | aspheric | −4.0634 | 0.2000 | 1.55 | 56.1 | −14.3470 |
| S8 | aspheric | 16.8038 | 0.3587 | | | −30.0000 |
| S9 | aspheric | −22.7172 | 0.2000 | 1.55 | 56.1 | 25.0000 |
| S10 | aspheric | 57.6118 | 0.9724 | | | −30.0000 |
| S11 | aspheric | −6.1741 | 0.3629 | 1.64 | 23.8 | −16.6693 |
| S12 | aspheric | −4.3209 | 0.8110 | | | −1.6695 |
| S13 | aspheric | −1.9712 | 0.5090 | 1.54 | 55.7 | −4.8092 |
| S14 | aspheric | −4.5860 | 0.4399 | | | 1.6625 |
| S15 | spherical | infinite | 0.1100 | 1.52 | 64.2 | |
| S16 | spherical | infinite | 0.5000 | | | |
| S17 | spherical | infinite | | | | |

As can be seen from Table 19, in embodiment 7, the object-side surface and the image-side surface of any one of the first lens E1 to the seventh lens E7 are aspheric. Table 20 shows high-order coefficients applicable to each aspheric surface in embodiment 7, wherein the surface shape of each aspheric surface can be defined by the formula (1) given in the above embodiment 1.

TABLE 20

| Surface number | A4 | A6 | A8 | A10 | A12 |
|---|---|---|---|---|---|
| S1 | −8.7604E−04 | −1.9000E−03 | 6.4160E−05 | −1.1324E−05 | −9.8222E−04 |
| S2 | −8.0133E−03 | 1.8929E−03 | 1.4140E−03 | −3.1357E−05 | −2.6385E−04 |
| S3 | 1.5470E−02 | 8.4085E−03 | 6.3782E−03 | 3.7662E−03 | −1.4588E−03 |
| S4 | 3.5642E−03 | 1.2206E−02 | 9.3122E−03 | 5.2251E−03 | 8.6819E−03 |
| S5 | −3.3078E−02 | −4.5570E−03 | 1.2006E−02 | 4.9977E−03 | −6.4339E−03 |
| S6 | 2.2222E−02 | 1.8308E−02 | 1.7022E−03 | −7.3911E−03 | −2.0316E−02 |
| S7 | 8.1376E−02 | 9.6114E−03 | 1.9480E−03 | −4.0087E−03 | −5.4033E−03 |
| S8 | −3.1814E−02 | −1.2474E−02 | −6.4100E−03 | 2.1530E−03 | 7.3537E−03 |
| S9 | −1.1615E−01 | −2.4073E−02 | −1.5757E−02 | −5.1996E−03 | −9.0416E−03 |
| S10 | −5.8935E−03 | −2.5590E−03 | 7.4720E−04 | 5.2460E−04 | −3.1808E−06 |
| S11 | 2.5192E−02 | −4.4710E−03 | −2.1400E−04 | 1.5361E−04 | −2.6984E−05 |
| S12 | 3.9161E−02 | −9.1920E−03 | 9.8660E−05 | −1.3976E−05 | −1.1882E−05 |
| S13 | 5.5931E−03 | −1.6790E−03 | 4.3550E−04 | −2.8666E−05 | −1.1076E−06 |
| S14 | 8.6814E−03 | −3.0380E−03 | 3.4080E−04 | 1.7498E−06 | −8.3533E−07 |

Table 21 shows effective focal lengths f1 to f7 of respective lens, a total effective focal length f of the optical imaging lens assembly, a total optical length TTL, and half of a maximal field-of-view HFOV in embodiment 7.

TABLE 21

| f1 (mm) | 3.02 | f6 (mm) | 20.94 |
|---|---|---|---|
| f2 (mm) | −4.83 | f7 (mm) | −6.91 |
| f3 (mm) | 7.47 | f (mm) | 7.50 |
| f4 (mm) | −5.97 | TTL (mm) | 6.43 |
| f5 (mm) | −29.82 | HFOV (°) | 24.4 |

Figures 14A, 14B:
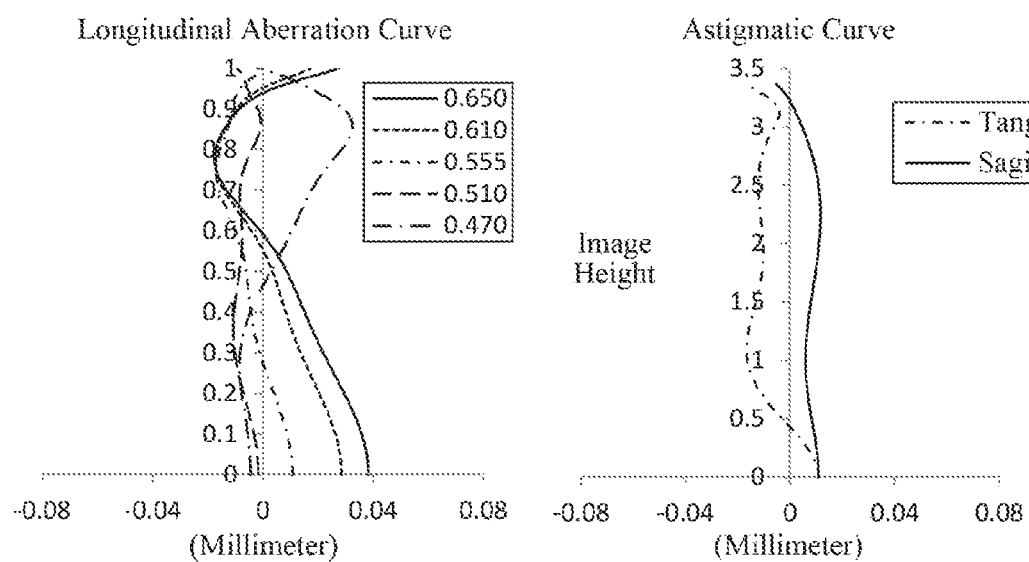
FIGS. 14A to 14D illustrate a longitudinal aberration curve, an astigmatism curve, a distortion curve and a lateral color curve of the optical imaging lens assembly according to embodiment 7, respectively.
Figure 14C:
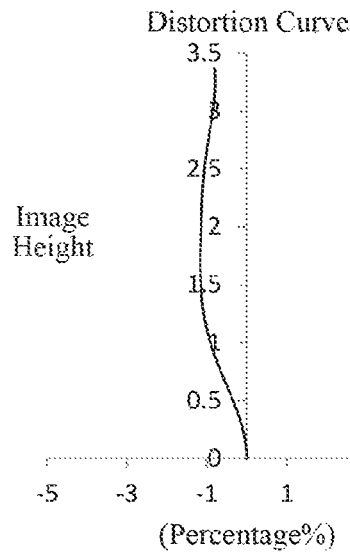
Figure 14D:
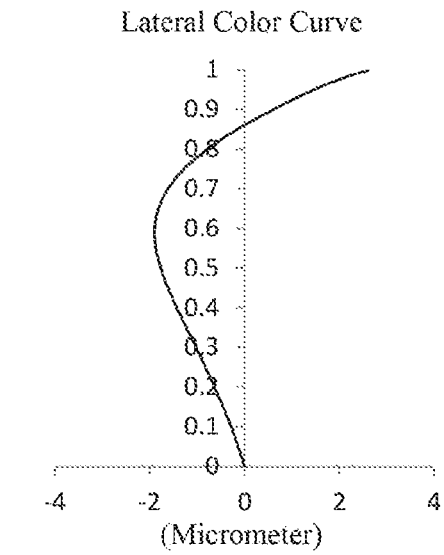

FIG. 14A illustrates a longitudinal aberration curve of the optical imaging lens assembly according to embodiment 7, representing deviations of focal points converged by light of different wavelengths after passing through the optical imaging lens assembly. FIG. 14B illustrates an astigmatism curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion corresponding to different FOVs. FIG. 14D illustrates a lateral color curve of the optical imaging lens assembly according to embodiment 7, representing deviations of different image heights on an imaging plane after light passes through the optical imaging lens assembly. It can be seen from FIG. 14A to FIG. 14D that the optical imaging lens assembly provided in embodiment 7 can achieve a good imaging quality.

Embodiment 8

Figure 15:
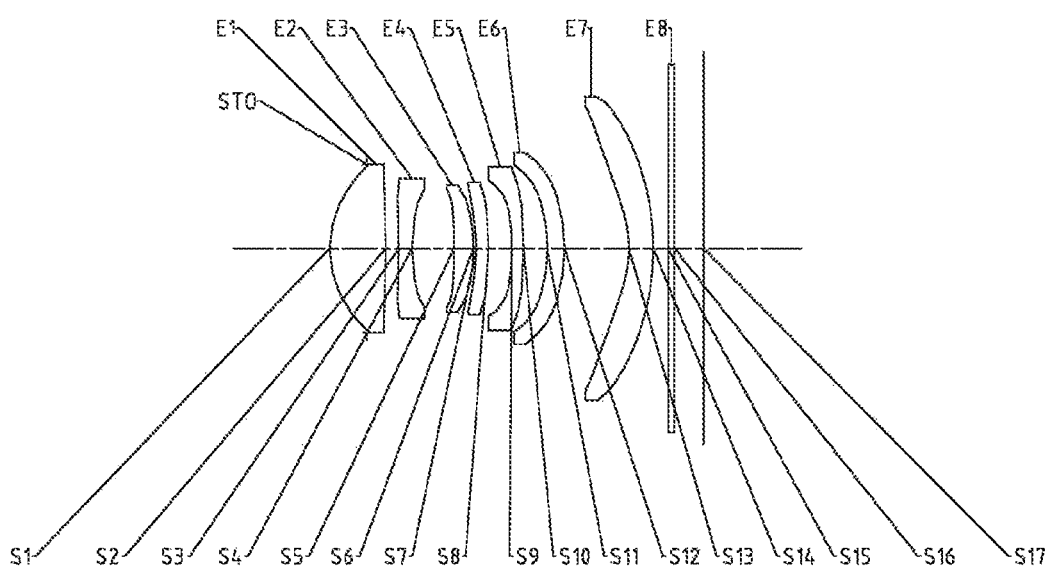
FIG. 15 is a schematic structural view of an optical imaging lens assembly according to embodiment 8 of the present disclosure.

An optical imaging lens assembly according to embodiment 8 of the present disclosure is described below with reference to FIG. 15 to FIG. 16D. FIG. 15 is a schematic structural view of the optical imaging lens assembly according to embodiment 8 of the present disclosure.

As shown in FIG. 15, the optical imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a convex surface. The fifth lens E5 has a negative refractive power, and an object-side surface S9 thereof is a concave surface, and an image-side surface S10 thereof is a convex surface. The sixth lens E6 has a positive refractive power, and an object-side surface S11 thereof is a concave surface, and an image-side surface S12 thereof is a convex surface. The seventh lens E7 has a negative refractive power, and an object-side surface S13 thereof is a concave surface, and an image-side surface S14 thereof is a convex surface. The optical filter E8 has an object-side surface S15 and an image-side surface S16. Light from the object sequentially passes through the respective surfaces S1 to S16 and is finally imaged on the imaging plane S17.

Table 22 shows the surface type, radius of curvature, thickness, material and conic coefficient of each lens of the optical imaging lens assembly in embodiment 8, wherein the units for the radius of curvature and the thickness are millimeter (mm).

TABLE 22

| Surface number | Surface Type | Radius of curvature | Thickness | Material Refractive index | Abbe number | Conic co-efficient |
|---|---|---|---|---|---|---|
| OBJ | spherical | infinite | infinite | | | |
| STO | spherical | infinite | −0.6379 | | | |
| S1 | aspheric | 1.8142 | 0.9649 | 1.55 | 56.1 | −0.0365 |
| S2 | aspheric | −21.3769 | 0.2214 | | | −30.0000 |
| S3 | aspheric | −14.1026 | 0.2300 | 1.67 | 20.4 | −30.0000 |
| S4 | aspheric | 3.6804 | 0.7202 | | | 8.4800 |
| S5 | aspheric | −29.2133 | 0.3350 | 1.64 | 23.8 | 25.0000 |
| S6 | aspheric | −3.2695 | 0.0539 | | | 1.6463 |
| S7 | aspheric | −2.8551 | 0.2037 | 1.55 | 56.1 | 0.9707 |
| S8 | aspheric | −7.0546 | 0.4037 | | | 6.7754 |
| S9 | aspheric | −6.5544 | 0.2000 | 1.55 | 56.1 | 10.4892 |
| S10 | aspheric | −14.4202 | 0.4076 | | | 25.0000 |
| S11 | aspheric | −3.1413 | 0.2974 | 1.64 | 23.8 | 2.8953 |
| S12 | aspheric | −3.1799 | 1.1077 | | | 2.2343 |
| S13 | aspheric | −2.0377 | 0.4217 | 1.54 | 55.7 | −3.6511 |
| S14 | aspheric | −4.3817 | 0.2526 | | | 1.5351 |
| S15 | spherical | infinite | 0.1100 | 1.52 | 64.2 | |
| S16 | spherical | infinite | 0.5000 | | | |
| S17 | spherical | infinite | | | | |

As can be seen from Table 22, in embodiment 8, the object-side surface and the image-side surface of any one of the first lens E1 to the seventh lens E7 are aspheric. Table 23 shows high-order coefficients applicable to each aspheric surface in embodiment 8, wherein the surface shape of each aspheric surface can be defined by the formula (1) given in the above embodiment 1.

TABLE 23

| Surface number | A4 | A6 | A8 | A10 | A12 |
|---|---|---|---|---|---|
| S1 | −1.0342E−03 | −6.6800E−04 | −1.0700E−03 | 8.6413E−04 | −5.2934E−04 |
| S2 | 1.8735E−03 | 1.6047E−03 | −6.7100E−04 | −6.7983E−04 | 2.8628E−04 |
| S3 | 1.6664E−02 | 8.3272E−03 | −1.8770E−03 | 3.4113E−04 | 8.8339E−04 |
| S4 | 1.1410E−02 | 4.8633E−03 | 3.0587E−03 | −2.7835E−03 | 2.6835E−03 |
| S5 | −4.4190E−02 | −3.2431E−02 | −8.0610E−03 | −1.2837E−02 | 4.5682E−03 |
| S6 | −1.0866E−02 | −1.7633E−02 | −1.5778E−02 | 2.4465E−03 | 1.7129E−03 |
| S7 | 4.2638E−02 | 1.8684E−02 | −3.2810E−03 | −1.1031E−03 | 2.0125E−03 |
| S8 | −2.1180E−02 | 6.5970E−04 | −3.0580E−03 | −1.6391E−03 | −3.4133E−04 |
| S9 | −9.3868E−02 | −2.3423E−02 | −6.0590E−03 | −5.5233E−03 | 6.3734E−04 |
| S10 | −3.7199E−02 | −6.3250E−03 | 9.0810E−04 | 8.0837E−04 | 3.4748E−04 |
| S11 | 5.2947E−03 | −1.1703E−02 | −3.2080E−03 | 1.0770E−03 | −2.0716E−04 |
| S12 | 1.3741E−02 | −1.0370E−02 | −1.1760E−03 | 9.0900E−04 | −4.5204E−05 |
| S13 | 8.1915E−03 | −6.2400E−04 | 2.0940E−04 | −2.7469E−05 | −9.3849E−07 |
| S14 | 4.1361E−03 | −4.2200E−04 | 9.4120E−05 | 8.8833E−06 | −1.7981E−06 |

Table 24 shows effective focal lengths f1 to f7 of respective lens, a total effective focal length f of the optical imaging lens assembly, a total optical length TTL, and half of a maximal field-of-view HFOV in embodiment 8.

TABLE 24

| f1 (mm) | 3.11 | f6 (mm) | 202.17 |
|---|---|---|---|
| f2 (mm) | −4.36 | f7 (mm) | −7.57 |
| f3 (mm) | 5.73 | f (mm) | 7.08 |
| f4 (mm) | −8.94 | TTL (mm) | 6.43 |
| f5 (mm) | −22.21 | HFOV (°) | 25.7 |

Figure 16A:
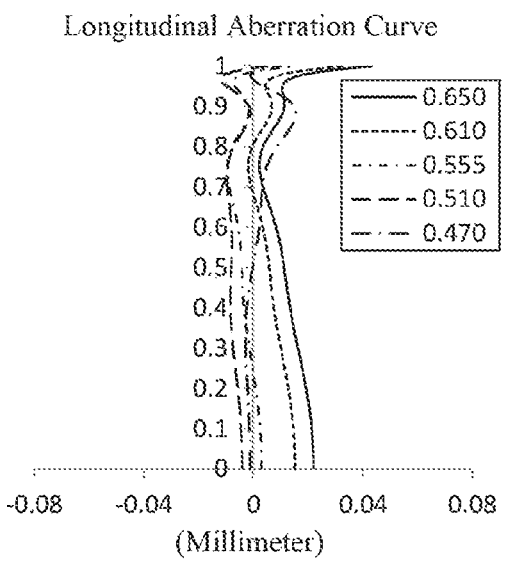
FIGS. 16A to 16D illustrate a longitudinal aberration curve, an astigmatism curve, a distortion curve and a lateral color curve of the optical imaging lens assembly according to embodiment 8, respectively.
Figure 16B:
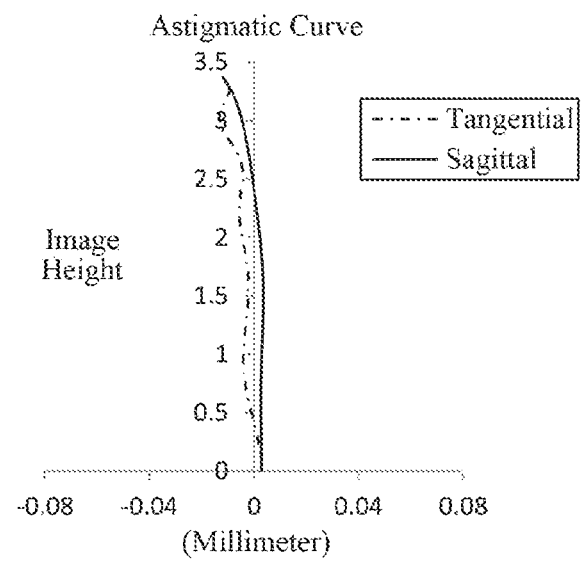
Figure 16C:
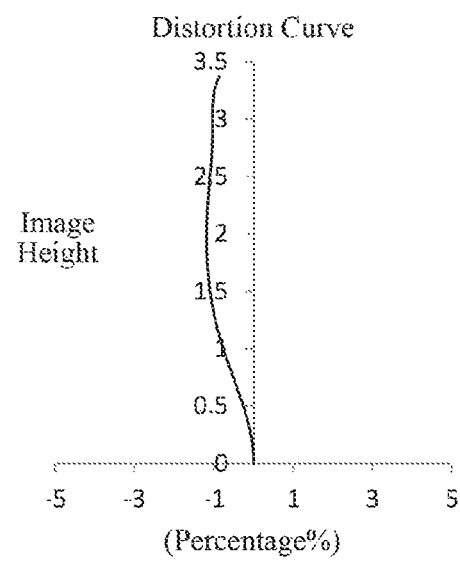
Figure 16D:
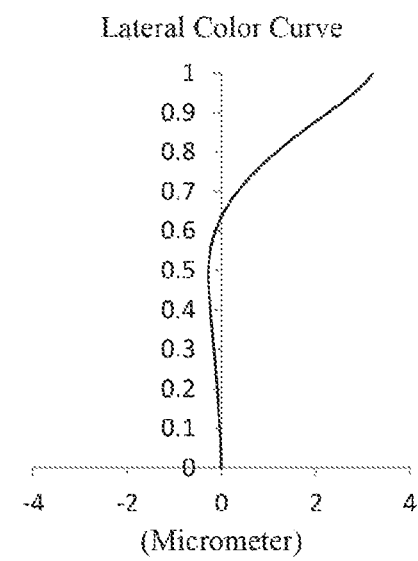

FIG. 16A illustrates a longitudinal aberration curve of the optical imaging lens assembly according to embodiment 8, representing deviations of focal points converged by light of different wavelengths after passing through the optical imaging lens assembly. FIG. 16B illustrates an astigmatism curve of the optical imaging lens assembly according to embodiment 8, representing a curvature of a tangential plane and a curvature of a sagittal plane. FIG. 16C illustrates a distortion curve of the optical imaging lens assembly according to embodiment 8, representing amounts of distortion corresponding to different FOVs. FIG. 16D illustrates a lateral color curve of the optical imaging lens assembly according to embodiment 8, representing deviations of different image heights on an imaging plane after light passes through the optical imaging lens assembly. It can be seen from FIG. 16A to FIG. 16D that the optical imaging lens assembly provided in embodiment 8 can achieve a good imaging quality.

Embodiment 9

Figure 17:
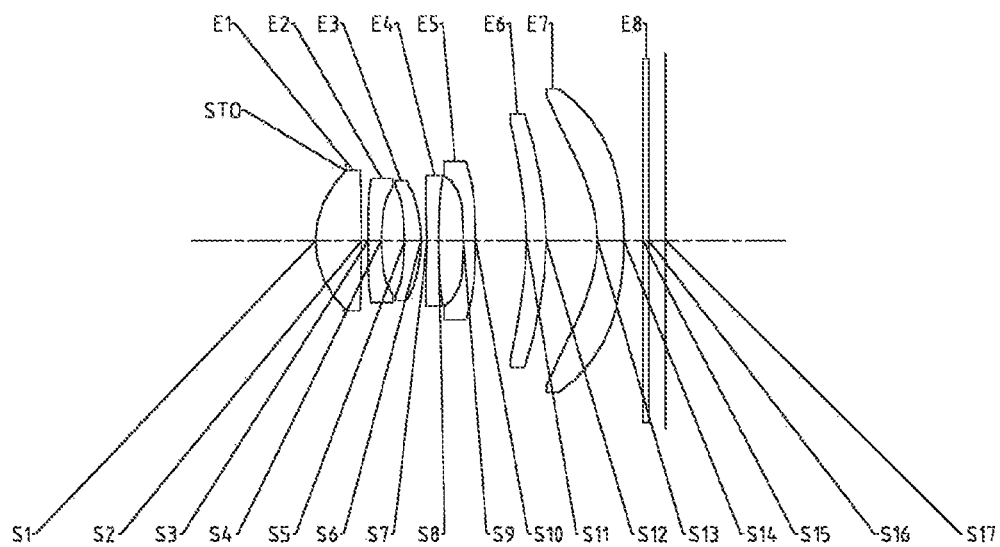
FIG. 17 is a schematic structural view of an optical imaging lens assembly according to embodiment 9 of the present disclosure.

An optical imaging lens assembly according to embodiment 9 of the present disclosure is described below with reference to FIG. 17 to FIG. 18D. FIG. 17 is a schematic structural view of the optical imaging lens assembly according to embodiment 9 of the present disclosure.

As shown in FIG. 17, the optical imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a positive refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a convex surface. The seventh lens E7 has a negative refractive power, and an object-side surface S13 thereof is a concave surface, and an image-side surface S14 thereof is a convex surface. The optical filter E8 has an object-side surface S15 and an image-side surface S16. Light from the object sequentially passes through the respective surfaces S1 to S16 and is finally imaged on the imaging plane S17.

Table 25 shows the surface type, radius of curvature, thickness, material and conic coefficient of each lens of the optical imaging lens assembly in embodiment 9, wherein the units for the radius of curvature and the thickness are millimeter (mm).

TABLE 25

| Surface number | Surface Type | Radius of curvature | Thickness | Material Refractive index | Abbe number | Conic coefficient |
| --- | --- | --- | --- | --- | --- | --- |
| OBJ | spherical | infinite | infinite | | | |
| STO | spherical | infinite | −0.5477 | | | |
| S1 | aspheric | 1.6767 | 0.8347 | 1.55 | 56.1 | −0.0522 |
| S2 | aspheric | −31.8661 | 0.1218 | | | 25.0000 |
| S3 | aspheric | −220.4280 | 0.2300 | 1.67 | 20.4 | −30.0000 |
| S4 | aspheric | 3.5556 | 0.4301 | | | 8.4899 |
| S5 | aspheric | −4.4766 | 0.2927 | 1.64 | 23.8 | 12.9372 |
| S6 | aspheric | −2.5104 | 0.1109 | | | −2.6555 |
| S7 | aspheric | −5.3755 | 0.2037 | 1.55 | 56.1 | −5.8360 |
| S8 | aspheric | 8.7220 | 0.4560 | | | −30.0000 |
| S9 | aspheric | −11.5625 | 0.2200 | 1.55 | 56.1 | 25.0000 |
| S10 | aspheric | −11.6032 | 0.9197 | | | 25.0000 |
| S11 | aspheric | −4.9057 | 0.3534 | 1.64 | 23.8 | −10.1878 |
| S12 | aspheric | −5.1350 | 0.9304 | | | −1.7461 |
| S13 | aspheric | −2.1762 | 0.4767 | 1.54 | 55.7 | −7.3221 |
| S14 | aspheric | −5.6027 | 0.3400 | | | −26.6259 |
| S15 | spherical | infinite | 0.1100 | 1.52 | 64.2 | |
| S16 | spherical | infinite | 0.3000 | | | |
| S17 | spherical | infinite | | | | |

As can be seen from Table 25, in embodiment 9, the object-side surface and the image-side surface of any one of the first lens E1 to the seventh lens E7 are aspheric. Table 26 shows high-order coefficients applicable to each aspheric surface in embodiment 9, wherein the surface shape of each aspheric surface can be defined by the formula (1) given in the above embodiment 1.

TABLE 26

| Surface number | A4 | A6 | A8 | A10 |
| --- | --- | --- | --- | --- |
| S1 | 1.1359E−03 | −1.4350E−03 | 2.1848E−03 | −2.1564E−03 |
| S2 | −3.5738E−03 | 3.5121E−03 | −1.7580E−03 | 8.8933E−04 |
| S3 | 1.1652E−02 | 6.9666E−03 | 6.9492E−03 | 3.0423E−04 |
| S4 | 1.3964E−02 | 9.7227E−03 | 5.9964E−03 | 8.0571E−03 |
| S5 | −3.3967E−02 | 2.3605E−02 | 1.4355E−03 | −1.5550E−02 |
| S6 | 8.0502E−03 | −1.0353E−02 | −1.2342E−02 | −9.1960E−03 |
| S7 | 8.3910E−02 | −2.7834E−02 | 5.0557E−03 | 2.4762E−04 |
| S8 | −1.8414E−02 | 6.1896E−03 | 6.0170E−03 | 1.0423E−03 |
| S9 | −8.8863E−02 | −2.4416E−02 | −8.9900E−04 | −8.0996E−03 |
| S10 | −2.0235E−02 | −2.4080E−03 | 3.9780E−04 | 6.1930E−04 |
| S11 | 6.8593E−03 | −1.7900E−04 | −6.0300E−05 | −2.5670E−05 |
| S12 | 1.7051E−02 | −7.2150E−03 | 1.5600E−03 | −1.2771E−04 |
| S13 | −1.3578E−02 | 7.1160E−04 | 2.9500E−04 | −2.7374E−05 |
| S14 | −1.4207E−02 | −1.0630E−03 | 3.3410E−04 | −2.6684E−05 |

Table 27 shows effective focal lengths f1 to f7 of respective lens, a total effective focal length f of the optical imaging lens assembly, a total optical length TTL, and half of a maximal field-of-view HFOV in embodiment 9.

TABLE 27

| f1 (mm) | 2.94 | f6 (mm) | −430.87 |
| --- | --- | --- | --- |
| f2 (mm) | −5.25 | f7 (mm) | −6.97 |
| f3 (mm) | 8.46 | f (mm) | 7.20 |
| f4 (mm) | −6.06 | TTL (mm) | 6.33 |
| f5 (mm) | 6646.43 | HFOV (°) | 25.3 |

Figures 18A, 18B:
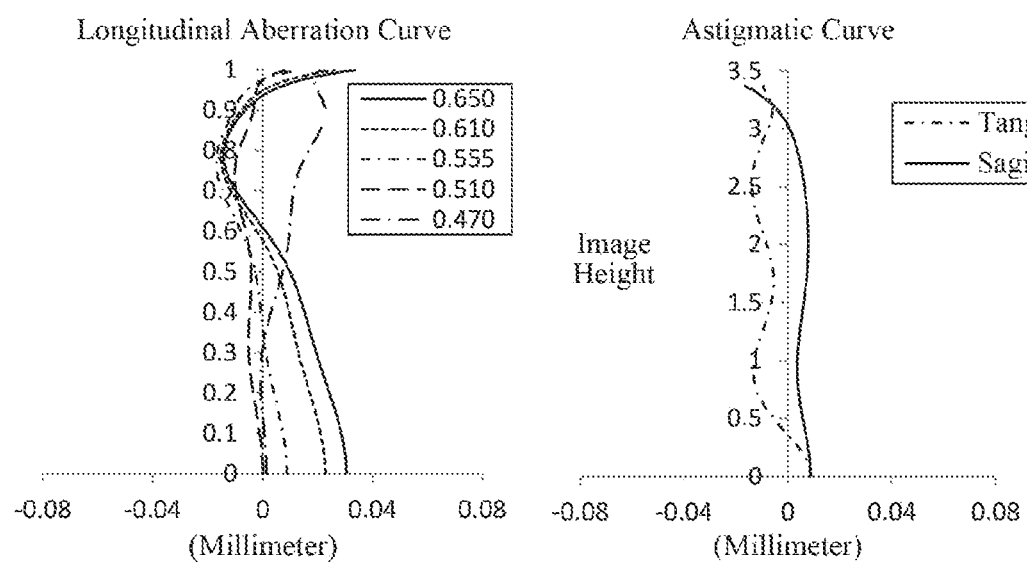
FIGS. 18A to 18D illustrate a longitudinal aberration curve, an astigmatism curve, a distortion curve and a lateral color curve of the optical imaging lens assembly according to embodiment 9, respectively.
Figure 18C:
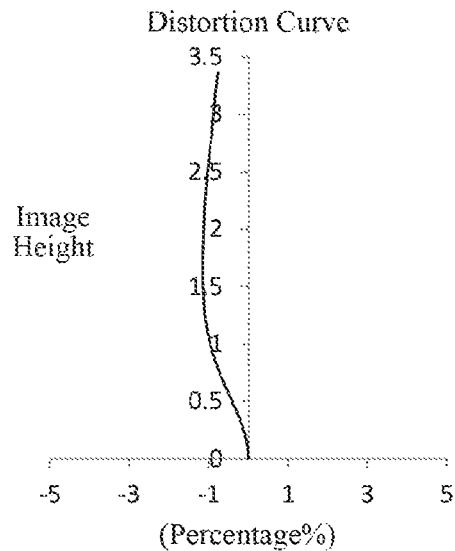
Figure 18D:
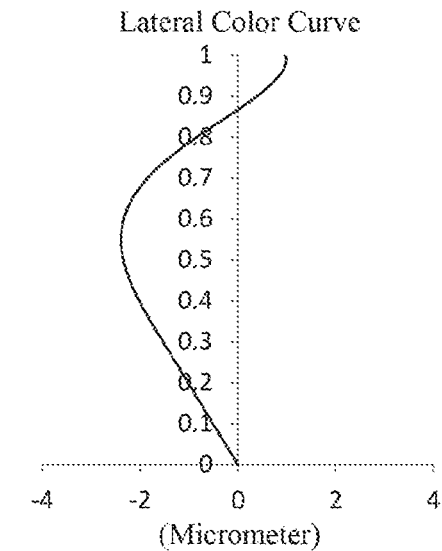

FIG. 18A illustrates a longitudinal aberration curve of the optical imaging lens assembly according to embodiment 9, representing deviations of focal points converged by light of different wavelengths after passing through the optical imaging lens assembly. FIG. 18B illustrates an astigmatism curve of the optical imaging lens assembly according to embodiment 9, representing a curvature of a tangential plane and a curvature of a sagittal plane. FIG. 18C illustrates a distortion curve of the optical imaging lens assembly according to embodiment 9, representing amounts of distortion corresponding to different FOVs. FIG. 18D illustrates a lateral color curve of the optical imaging lens assembly according to embodiment 9, representing deviations of different image heights on an imaging plane after light passes through the optical imaging lens assembly. It can be seen from FIG. 18A to FIG. 18D that the optical imaging lens assembly provided in embodiment 9 can achieve a good imaging quality.

Embodiment 10

Figure 19:
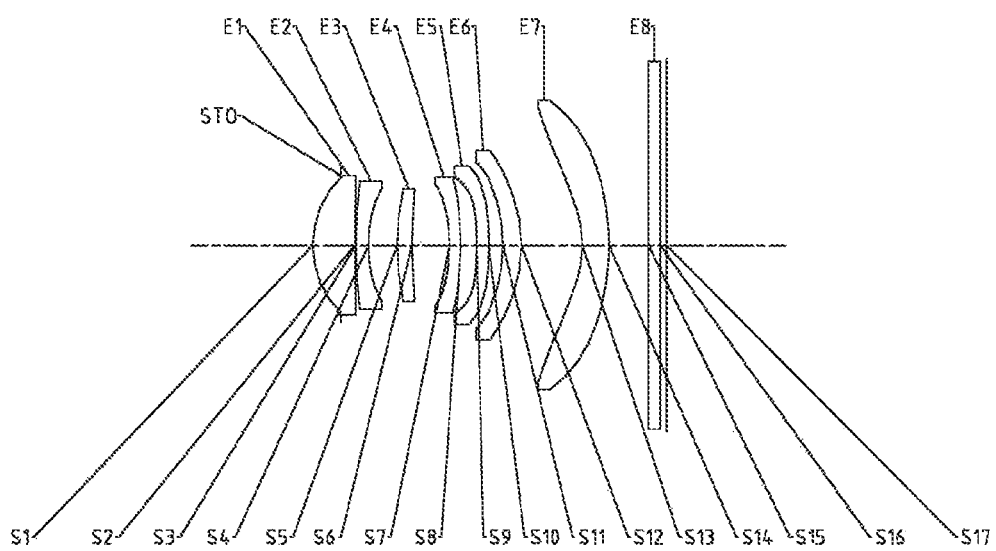
FIG. 19 is a schematic structural view of an optical imaging lens assembly according to embodiment 10 of the present disclosure.

An optical imaging lens assembly according to embodiment 10 of the present disclosure is described below with reference to FIG. 19 to FIG. 20D. FIG. 19 is a schematic structural view of the optical imaging lens assembly according to embodiment 10 of the present disclosure.

As shown in FIG. 19, the optical imaging lens assembly according to an example implementation of the present disclosure includes, sequentially from an object side to an image side along an optical axis, a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a concave surface. The fourth lens E4 has a negative refractive power, and an object-side surface S7 thereof is a concave surface, and an image-side surface S8 thereof is a convex surface. The fifth lens E5 has a positive refractive power, and an object-side surface S9 thereof is a concave surface, and an image-side surface S10 thereof is a convex surface. The sixth lens E6 has a positive refractive power, and an object-side surface S11 thereof is a concave surface, and an image-side surface S12 thereof is a convex surface. The seventh lens E7 has a negative refractive power, and an object-side surface S13 thereof is a concave surface, and an image-side surface S14 thereof is a convex surface. The optical filter E8 has an object-side surface S15 and an image-side surface S16. Light from the object sequentially passes through the respective surfaces S1 to S16 and is finally imaged on the imaging plane S17.

Table 28 shows the surface type, radius of curvature, thickness, material and conic coefficient of each lens of the optical imaging lens assembly in embodiment 10, wherein the units for the radius of curvature and the thickness are millimeter (mm).

TABLE 28

| Surface number | Surface Type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.5136 | | | |
| S1 | aspheric | 1.7466 | 0.7641 | 1.55 | 56.1 | 0.0762 |
| S2 | aspheric | 67.8628 | 0.0200 | | | 25.0000 |
| S3 | aspheric | 10.5869 | 0.2300 | 1.67 | 20.4 | 10.7039 |
| S4 | aspheric | 2.8429 | 0.5196 | | | 3.9518 |
| S5 | aspheric | 4.9340 | 0.2692 | 1.64 | 23.8 | 12.9603 |
| S6 | aspheric | 8.3135 | 0.6815 | | | −30.0000 |
| S7 | aspheric | −2.9537 | 0.2037 | 1.55 | 56.1 | 5.1477 |
| S8 | aspheric | −5.9596 | 0.2886 | | | −16.5580 |
| S9 | aspheric | −10.8200 | 0.2200 | 1.55 | 56.1 | 25.0000 |
| S10 | aspheric | −8.1677 | 0.2610 | | | 21.6160 |
| S11 | aspheric | −2.6803 | 0.3319 | 1.64 | 23.8 | −0.2992 |
| S12 | aspheric | −2.5201 | 1.1069 | | | 0.3990 |
| S13 | aspheric | −1.9023 | 0.4835 | 1.54 | 55.7 | −4.2678 |
| S14 | aspheric | −4.5546 | 0.7173 | | | 1.6992 |
| S15 | spherical | infinite | 0.2100 | 1.52 | 64.2 | |
| S16 | spherical | infinite | 0.1226 | | | |
| S17 | spherical | infinite | | | | |

As can be seen from Table 28, in embodiment 10, the object-side surface and the image-side surface of any one of the first lens E1 to the seventh lens E7 are aspheric. Table 29 shows high-order coefficients applicable to each aspheric surface in embodiment 10, wherein the surface shape of each aspheric surface can be defined by the formula (1) given in the above embodiment 1.

TABLE 29

| Surface number | A4 | A6 | A8 | A10 |
|---|---|---|---|---|
| S1 | −1.8946E−03 | −8.3400E−04 | 6.6020E−04 | −7.1523E−04 |
| S2 | 1.0631E−03 | 1.0640E−04 | −6.0200E−05 | 5.4177E−04 |
| S3 | 7.6041E−05 | 1.9828E−03 | 1.9008E−03 | 1.5727E−04 |
| S4 | −2.1821E−03 | 4.8587E−03 | 2.7304E−03 | 8.9837E−04 |
| S5 | −1.8533E−02 | 2.3804E−03 | 2.2367E−03 | 2.3106E−03 |
| S6 | −1.2573E−02 | −9.0800E−04 | −8.1200E−04 | 1.7941E−03 |
| S7 | 3.3862E−02 | −7.7420E−03 | 3.8802E−03 | −3.4160E−03 |
| S8 | −2.2193E−04 | −5.7330E−03 | −1.9240E−03 | −9.4694E−05 |
| S9 | −8.1342E−02 | −2.0436E−02 | −1.1545E−02 | 1.5771E−03 |
| S10 | −2.9546E−02 | −7.1600E−03 | 7.3530E−05 | −5.0656E−05 |
| S11 | 1.5292E−02 | 2.5450E−04 | −2.4640E−03 | −8.6741E−04 |
| S12 | 2.8771E−02 | −6.2490E−03 | 3.2960E−04 | 2.6145E−04 |
| S13 | −1.7218E−03 | 5.1010E−04 | 2.2520E−04 | −3.0831E−05 |
| S14 | 4.9621E−03 | −1.3150E−03 | 7.4720E−05 | 5.8529E−06 |

Table 30 shows effective focal lengths f1 to f7 of respective lens, a total effective focal length f of the optical imaging lens assembly, a total optical length TTL, and half of a maximal field-of-view HFOV in embodiment 10.

TABLE 30

| f1 (mm) | 3.27 | f6 (mm) | 36.52 |
|---|---|---|---|
| f2 (mm) | −5.91 | f7 (mm) | −6.50 |
| f3 (mm) | 18.43 | f (mm) | 7.20 |
| f4 (mm) | −10.99 | TTL (mm) | 6.43 |
| f5 (mm) | 59.30 | HFOV (°) | 25.3 |

Figure 20A:
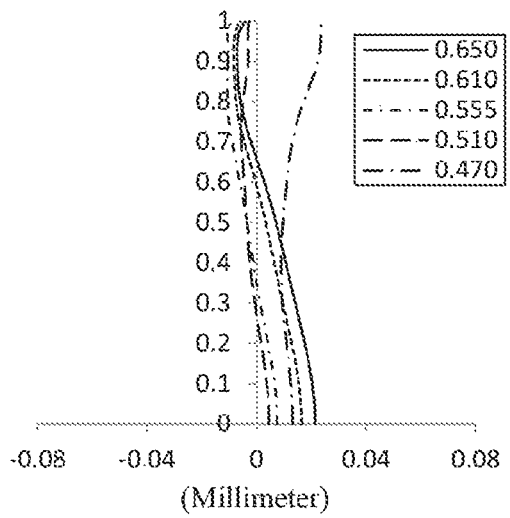
FIGS. 20A to 20D illustrate a longitudinal aberration curve, an astigmatism curve, a distortion curve and a lateral color curve of the optical imaging lens assembly according to embodiment 10, respectively.
Figure 20B:
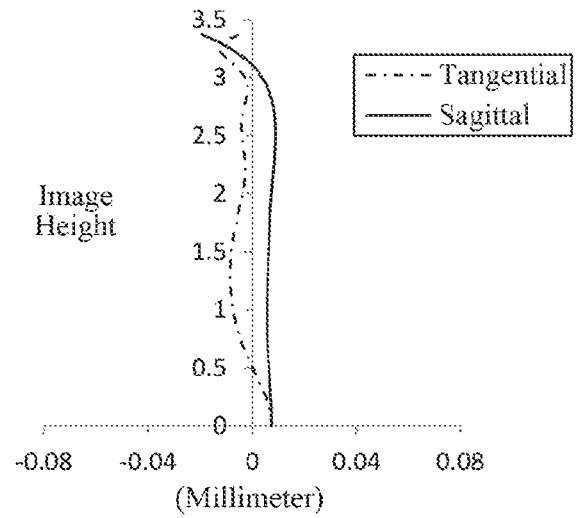
Figure 20C:
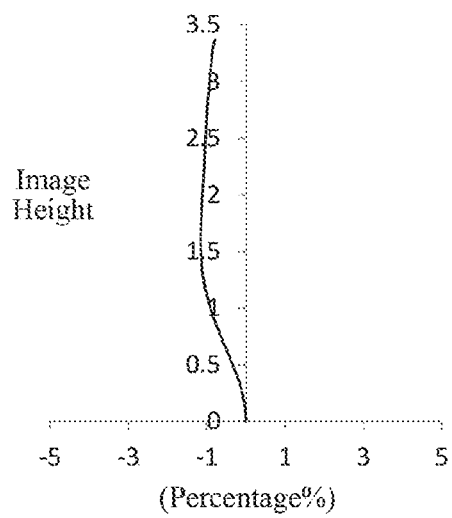
Figure 20D:
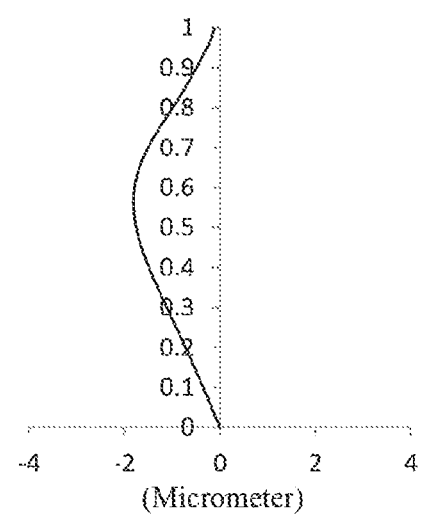

FIG. 20A illustrates a longitudinal aberration curve of the optical imaging lens assembly according to embodiment 10, representing deviations of focal points converged by light of different wavelengths after passing through the optical imaging lens assembly. FIG. 20B illustrates an astigmatism curve of the optical imaging lens assembly according to embodiment 10, representing a curvature of a tangential plane and a curvature of a sagittal plane. FIG. 20C illustrates a distortion curve of the optical imaging lens assembly according to embodiment 10, representing amounts of distortion corresponding to different FOVs. FIG. 20D illustrates a lateral color curve of the optical imaging lens assembly according to embodiment 10, representing deviations of different image heights on an imaging plane after light passes through the optical imaging lens assembly. It can be seen from FIG. 20A to FIG. 20D that the optical imaging lens assembly provided in embodiment 10 can achieve a good imaging quality.

In view of the above, embodiments 1 to 10 respectively satisfy the relationship shown in Table 31.

TABLE 31

| Formula | Embodiment | | | | | | | | | |
|---|---|---|---|---|---|---|---|---|---|---|
| | 1 | 2 | 3 | 4 | 5 | 6 | 7 | 8 | 9 | 10 |
| HFOV (°) | 23.5 | 24.2 | 25.0 | 24.7 | 24.6 | 25.3 | 24.4 | 25.7 | 25.3 | 25.3 |
| f/f1 | 2.51 | 2.46 | 2.26 | 2.31 | 2.52 | 2.06 | 2.48 | 2.28 | 2.45 | 2.20 |
| (f3 + f4)/TTL | 1.57 | 1.22 | 0.44 | −5.09 | 4.48 | 3.70 | 0.23 | −0.50 | 0.38 | 1.16 |
| f/R4 | 1.13 | 1.27 | 1.57 | 3.08 | 2.78 | 2.80 | 2.54 | 1.92 | 2.02 | 2.53 |
| f7/f2 | 1.19 | 1.25 | 1.30 | 0.92 | 1.30 | 0.65 | 1.43 | 1.74 | 1.33 | 1.10 |
| R7/R12 | 1.45 | 1.32 | 1.30 | 1.06 | 0.35 | 2.62 | 0.94 | 0.90 | 1.05 | 1.17 |
| f7/|R11 + R12| | −0.82 | −0.83 | −0.79 | −0.49 | −0.35 | −0.53 | −0.66 | −1.20 | −0.69 | −1.25 |
| ΣCT/ΣAT | 1.58 | 1.52 | 2.11 | 0.86 | 1.02 | 0.74 | 0.98 | 0.91 | 0.88 | 0.87 |
| f3/|f4 + f5| | 0.48 | 0.05 | 0.72 | 0.31 | 1.43 | 2.90 | 0.21 | 0.18 | 0.00 | 0.38 |
| (V5 + V6)/V7 | 1.43 | 1.43 | 1.43 | 1.43 | 1.43 | 1.43 | 1.43 | 1.43 | 1.43 | 1.43 |
| |R3 + R4|/|R3 − R4| | 0.19 | 0.31 | 0.46 | 2.07 | 1.60 | 3.16 | 1.18 | 0.59 | 0.97 | 1.73 |

The present disclosure further provides an imaging apparatus, having a photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising, sequentially from an object side of the optical imaging lens assembly to an image side the optical imaging lens assembly along an optical axis, a first lens, a second lens, a third lens, a fourth lens, a fifth lens, a sixth lens and a seventh lens, wherein:
   the first lens has a positive refractive power, and an object-side surface of the first lens is a convex surface;
   the second lens has a negative refractive power, and an image-side surface of the second lens is a concave surface;
   the third lens has a positive refractive power;
   the fourth lens has a negative refractive power;
   each of the fifth lens and the sixth lens has a positive refractive power or a negative refractive power;
   the seventh lens has a negative refractive power, and an object-side surface of the seventh lens is a concave surface;
   a total effective focal length f of the optical imaging lens assembly and an effective focal length f1 of the first lens satisfy f/f1≥2.0;
   a radius or curvature R7 of an object-side surface of the fourth lens and a radius of curvature R12 of an image-side surface of the sixth lens satisfy 0<R7/R12<3.0; and
   an effective focal length f7 of the seventh lens, a radius of curvature R11 of an object-side surface of the sixth lens and a radius of curvature R12 of an image-side surface of the sixth lens satisfy 1.5<f7/|R11+R12|.

2. The optical imaging lens assembly according to claim 1, wherein the total effective focal length f of the optical imaging lens assembly and the effective focal length f1 of the first lens satisfy 2.0≤f/f1≤7.0.

3. The optical imaging lens assembly according to claim 1, wherein a sum of center thicknesses ΣCT on the optical axis of the first lens to the seventh lens and a sum of spaced distances ΣAT on the optical axis between any two adjacent lenses of the first lens to the seventh lens satisfy ΣCT/ΣAT<2.5.

4. The optical imaging lens assembly according to claim 1, wherein an effective focal length f3 of the third lens, an effective focal length f4 of the fourth lens and a distance TTL on the optical axis from a center of the object-side surface of the first lens to an imaging plane of the optical imaging lens assembly satisfy −5.5<(f3+f4)/TTL<5.0.

5. The optical imaging lens assembly according to claim 1, wherein the total effective focal length f of the optical imaging lens assembly and a radius of curvature R4 of the image-side surface of the second lens satisfy 1.0<f/R4<3.5.

6. The optical imaging lens assembly according to claim 1, wherein an effective focal length f3 of the third lens, an effective focal length f4 of the fourth lens and an effective focal length f5 of the fifth lens satisfy 0≤f3/|f4+f5|≤3.0.

7. The optical imaging lens assembly according to claim 1, wherein a radius of curvature R3 of an object-side surface of the second lens and a radius of curvature R4 of the image-side surface of the second lens satisfy |R3+R4|/|R3−R4|<3.5.

8. The optical imaging lens assembly according to claim 1, wherein an abbe number V5 of the fifth lens, an abbe number V6 of the sixth lens and an abbe number V7 of the seventh lens satisfy 1.0<(V5+V6)/V7<7.0.

9. An optical imaging lens assembly, comprising, sequentially from an object side of the optical imaging lens assembly to an image side of the optical imaging lens assembly along an optical axis, a first lens, a second lens, a third lens, a fourth lens, a fifth lens, a sixth lens and a seventh lens, wherein:
   the first lens has a positive refractive power, and an object-side surface of the first lens is a convex surface;
   the second lens has a negative refractive power, and an image-side surface of the second lens is a concave surface;
   the third lens has a positive refractive power;
   each of the fifth lens and the sixth lens has a positive refractive power or a negative refractive power;

the fourth lens has a negative refractive power, and an object-side surface of the fourth lens is a concave surface;

the seventh lens has a negative refractive power, of which an object-side surface is a concave surface;

an effective focal length f7 of the seventh lens and an effective focal length f2 of the second lens satisfy $0.5 < f7/f2 < 2.0$;

a total effective focal length f of the optical imaging lens assembly and an effective focal length f1 of the first lens satisfy $f/f1 \geq 2.0$; and a radius or curvature R7 of an object-side surface of the fourth lens and a radius of curvature R12 of an image-side surface of the sixth lens satisfy $0 < R7/R12 < 3.0$; and an effective focal length f7 of the seventh lens, a radius of curvature R11 of an object-side surface of the sixth lens and a radius of curvature R12 of an image-side surface of the sixth lens satisfy $1.5 < f7/|R11+R12|$.

10. The optical imaging lens assembly according to claim 9, wherein a radius of curvature R3 of an object-side surface of the second lens and a radius of curvature R4 of the image-side surface of the second lens satisfy $|R3+R4|/|R3-R4| < 3.5$.

11. The optical imaging lens assembly according to claim 9, wherein a sum of center thicknesses $\Sigma CT$ on the optical axis of the first lens to the seventh lens and a sum of spaced distances $\Sigma AT$ on the optical axis between any two adjacent lenses of the first lens to the seventh lens satisfy $\Sigma CT/\Sigma AT < 2.5$.

12. An optical imaging lens assembly, comprising, sequentially from an object side of the optical imaging lens assembly to an image side of the optical imaging lens assembly along an optical axis, a first lens, a second lens, a third lens, a fourth lens, a fifth lens, a sixth lens and a seventh lens, wherein:

the first lens has a positive refractive power, and an object-side surface of the first lens is a convex surface;

the second lens has a negative refractive power, and an image-side surface of the second lens is a concave surface;

the third lens has a positive refractive power;

the fourth lens has a negative refractive power;

each of the fifth lens and the sixth lens has a positive refractive power or a negative refractive power;

an object-side surface of the sixth lens is a concave surface, and an image-side surface of the sixth lens is a convex surface;

the seventh lens has a negative refractive power, and an object-side surface of the seventh lens is a concave surface;

half of a maximal field-of-view HFOV of the optical imaging lens assembly satisfies $HFOV \leq 35°$;

a total effective focal length f of the optical imaging lens assembly and an effective focal length f1 of the first lens satisfy $f/f1 \geq 2.0$;

a radius or curvature R7 of an object-side surface of the fourth lens and a radius of curvature R12 of an image-side surface of the sixth lens satisfy $0 < R7/R12 < 3.0$; and an effective focal length f7 of the seventh lens, a radius of curvature R11 of an object-side surface of the sixth lens and a radius of curvature R12 of an image-side surface of the sixth lens satisfy $1.5 < f7/|R11+R12|$.

13. The optical imaging lens assembly according to claim 12, wherein an effective focal length f3 of the third lens, an effective focal length f4 of the fourth lens and an effective focal length f5 of the fifth lens satisfy $0 \leq f3/|f4+f5| \leq 3.0$.

14. The optical imaging lens assembly according to claim 12, wherein an effective focal length f3 of the third lens, an effective focal length f4 of the fourth lens and a distance TTL on the optical axis from a center of the object-side surface of the first lens to an imaging plane of the optical imaging lens assembly satisfy $-5.5 < (f3+f4)/TTL < 5.0$.

15. The optical imaging lens assembly according to claim 12, wherein a total effective focal length f of the optical imaging lens assembly and a radius of curvature R4 of the image-side surface of the second lens satisfy $1.0 < f/R4 < 3.5$.

* * * * *